US012786476B2

(12) United States Patent
Sjöberg et al.

(10) Patent No.: US 12,786,476 B2
(45) **Date of Patent: *Nov. 3, 2026**

(54) VIDEO PROCESSING

(71) Applicant: Telefonaktiebolaget LM Ericsson (publ), Stockholm (SE)

(72) Inventors: Rickard Sjöberg, Stockholm (SE); Martin Pettersson, Vallentuna (SE); Mitra Damghanian, Upplands-Bro (SE); Jacob Ström, Stockholm (SE); Zhi Zhang, Solna (SE); Kenneth Andersson, Gävle (SE); Jack Enhorn, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/927,361

(22) Filed: Oct. 25, 2024

(65) Prior Publication Data

US 2025/0119590 A1 Apr. 10, 2025

Related U.S. Application Data

(63) Continuation of application No. 18/136,462, filed on Apr. 19, 2023, now Pat. No. 12,167,041, which is a (Continued)

(51) Int. Cl.
*H04N 19/70* (2014.01)
*H04N 19/169* (2014.01)
(Continued)

(52) U.S. Cl.
CPC ........... *H04N 19/70* (2014.11); *H04N 19/186* (2014.11); *H04N 19/1883* (2014.11); *H04N 19/46* (2014.11)

(58) Field of Classification Search
CPC .. H04N 19/70; H04N 19/186; H04N 19/1883; H04N 19/46
See application file for complete search history.

(56) References Cited

U.S. PATENT DOCUMENTS

| | | | |
|---|---|---|---|
| 10,595,048 | B1 | 3/2020 | Wenger et al. |
| 2008/0240252 | A1 | 10/2008 | He |

(Continued)

FOREIGN PATENT DOCUMENTS

| | | |
|---|---|---|
| CN | 104662906 | 5/2015 |
| CN | 105721881 | 6/2016 |

(Continued)

OTHER PUBLICATIONS

Xu, J. et al., "AHG9: On deblocking control parameters", Joint Video Experts Team (JVET) of ITU-T SG 16 WP 3 and ISO/IEC JTC 1/SC 29/WG 11, Document: JVET-Q0121-v1, 17th Meeting: Brussels, BE, Jan. 7-17, 2020 (9 pages).

(Continued)

*Primary Examiner* — Jae N Noh
(74) *Attorney, Agent, or Firm* — Rothwell, Figg, Ernst & Manbeck, P.C.

(57) ABSTRACT

A method for deriving a value for a first syntax element, Syntax_A. The method comprises determining whether Syntax_A is present in a bitstream. The method comprises, as a result of determining that Syntax_A is not present in the bitstream, deriving the value for Syntax_A to be equal to a first value, B, if a first condition is satisfied, or deriving the value for Syntax_A to be equal to a second value, C, if a second condition is satisfied.

15 Claims, 12 Drawing Sheets

Related U.S. Application Data continuation of application No. 17/954,962, filed on Sep. 28, 2022, now Pat. No. 11,665,371, which is a continuation of application No. PCT/SE2021/050051, filed on Jan. 27, 2021.

(60) Provisional application No. 63/002,534, filed on Mar. 31, 2020.

(51) Int. Cl.
*H04N 19/186* (2014.01)
*H04N 19/46* (2014.01)

(56) References Cited

U.S. PATENT DOCUMENTS

| | | | | |
|---|---|---|---|---|
| 2013/0077677 | A1 | 3/2013 | Wang et al. | |
| 2014/0049604 | A1 | 2/2014 | Chen et al. | |
| 2014/0192892 | A1 | 7/2014 | Van Der Auwera et al. | |
| 2015/0016550 | A1 | 1/2015 | Kim et al. | |
| 2017/0295369 | A1 | 10/2017 | Nakagami | |
| 2018/0160118 | A1 | 6/2018 | Tsukuba et al. | |
| 2019/0166370 | A1 | 5/2019 | Xiu et al. | |
| 2019/0306502 | A1 | 10/2019 | Gadde et al. | |
| 2022/0394303 | A1 | 12/2022 | Sun et al. | |
| 2022/0400293 | A1* | 12/2022 | Xu | H04N 19/86 |
| 2023/0045656 | A1* | 2/2023 | Hendry | H04N 19/70 |

FOREIGN PATENT DOCUMENTS

| | | | |
|---|---|---|---|
| CN | 106797480 | | 5/2017 |
| CN | 107409225 | | 11/2017 |
| CN | 110393010 | | 10/2019 |
| CO | 6852030 | A2 | 1/2014 |
| JP | 2019-50621 | | 3/2019 |
| WO | 2015/043501 | | 4/2015 |
| WO | 2015/135169 | | 9/2015 |
| WO | 2015/187978 | | 12/2015 |
| WO | 2016/056398 | | 4/2016 |
| WO | 2017/016468 | | 2/2017 |
| WO | 2018/207956 | | 11/2018 |
| WO | 2019/007492 | | 1/2019 |
| WO | 2020/039365 | | 2/2020 |

OTHER PUBLICATIONS

International Search Report and Written Opinion issued in International Application No. PCT/SE2021/050051 dated Mar. 12, 2021 (17 pages).

IPRP issued in International Application No. PCT/SE2021/050051 dated May 20, 2022 (12 pages).

Zhang, Z. et al., "AHG9: Chroma deblocking strength signaling", Joint Video Experts Team (JVET) of ITU-T SG 16 WP 3 and ISO/IEC JTC 1/SC 29/WG 11, JVET-R0081-v1, 18th Meeting: by teleconference, Apr. 15-24, 2020 (9 pages).

Pettersson, M. et al., "AHG9: Fixes related to the picture header", Joint Video Experts Team (JVET) of ITU-T SG 16 WP 3 and ISO/IEC JTC 1/SC 29/WG 11, Document: JVET-R0251, 8th Meeting: by teleconference, Apr. 15-24, 2020 (4 pages).

Shibi, M., "Design of CABAC Decoder for HEVC", Dissertation Submitted for the Degree of Master, Hefei University of Technology, Hefei, Anhnui, P.R. China, Apr. 2018 (76 pages).

Rapaka, K. et al., "Efficient Key and Single Loop Decoding Scheme for Shvc", IEEE Xplore, Aug. 1, 2024 (6 pages).

Zhao, C., et al., "An Efficient Selective Encryption Algorithm Based on H.265," Journal of Shenyang University, vol. 31, No. 3 (Jun. 2019) (7 pages) (with English Abstract).

Zhao, C., et al., "Error Sensitivity Analysis for Macroblock's Bit Stream," Proceedings of IEEE TENCON'02 (2002) (pp. 750-753).

* cited by examiner

VIDEO PROCESSING

CROSS REFERENCE TO RELATED APPLICATIONS

This application is a continuation of U.S. patent application Ser. No. 18/136,462, filed on 2023 Apr. 19 (now U.S. Pat. No. 12,167,041 issued on 2024 Dec. 10), which is a continuation of U.S. patent application Ser. No. 17/954,962, filed on 2022 Sep. 28 (now U.S. Pat. No. 11,665,371 issued on 2023 May 30), which is a continuation of international patent application no. PCT/SE2021/050051, filed on 2021 Jan. 27, which claims priority to U.S. provisional patent application No. 63/002,534, filed 2020 Mar. 31. The above identified applications are incorporated by this reference.

TECHNICAL FIELD

Disclosed are embodiments related to the processing (e.g., decoding) of video data.

BACKGROUND

1. HEVC and VVC

High Efficiency Video Coding (HEVC) is a block-based video codec standardized by ITU-T and MPEG that utilizes both temporal and spatial prediction. Spatial prediction is achieved using intra (I) prediction from within the current picture. Temporal prediction is achieved using uni-directional (P) or bi-directional inter (B) prediction on block level from previously decoded reference pictures. In the encoder, the difference between the original pixel data and the predicted pixel data, referred to as the residual, is transformed into the frequency domain, quantized and then entropy coded before transmitted together with necessary prediction parameters such as prediction mode and motion vectors, also entropy coded. The decoder performs entropy decoding, inverse quantization and inverse transformation to obtain the residual, and then adds the residual to an intra or inter prediction to reconstruct a picture.

MPEG and ITU-T is working on the successor to HEVC within the Joint Video Exploratory Team (JVET). The name of this video codec under development is Versatile Video Coding (VVC). The current version of the VVC draft specification at the time of writing this text is JVET-Q2001-vD.

2. Components

A video (a.k.a., video sequence) consists of a series of pictures (a.k.a., images) where each picture consists of one or more components. Each component can be described as a two-dimensional rectangular array of sample values. It is common that a picture in a video sequence consists of three components; one luma component Y where the sample values are luma values and two chroma components Cb and Cr, where the sample values are chroma values. It is also common that the dimensions of the chroma components are smaller than the luma components by a factor of two in each dimension. For example, the size of the luma component of an HD picture would be 1920×1080 and the chroma components would each have the dimension of 960×540. Components are sometimes referred to as color components.

3. Blocks and Units

A block is one two-dimensional array of samples. In video coding, each component is split into blocks and the coded video bitstream consists of a series of coded blocks. It is common in video coding that the picture is split into units that cover a specific area of the picture. Each unit consists of all blocks from all components that make up that specific area and each block belongs fully to one unit. The macroblock in H.264 and the Coding unit (CU) in HEVC are examples of units.

A block can alternatively be defined as a two-dimensional array that a transform used in coding is applied to. These blocks are known under the name "transform blocks". Alternatively, a block can be defined as a two-dimensional array that a single prediction mode is applied to. These blocks can be called "prediction blocks". In this application, the word block is not tied to one of these definitions but that the descriptions herein can apply to either definition.

4. Residuals, Transforms and Quantization

A residual block consists of samples that represents sample value differences between sample values of the original source blocks and the prediction blocks. The residual block is processed using a spatial transform. In the encoder, the transform coefficients are quantized according to a quantization parameter (QP) which controls the precision of the quantized coefficients. The quantized coefficients can be referred to as residual coefficients. A high QP value would result in low precision of the coefficients and thus low fidelity of the residual block. A decoder receives the residual coefficients, applies inverse quantization and inverse transform to derive the residual block.

5. NAL Units

Both HEVC and VVC define a Network Abstraction Layer (NAL). All the data (i.e. both Video Coding Layer (VCL) or non-VCL data) in HEVC and VVC is encapsulated in NAL units. A VCL NAL unit contains data that represents picture sample values. A non-VCL NAL unit contains additional associated data such as parameter sets and supplemental enhancement information (SEI) messages. The NAL unit in HEVC begins with a header which specifies the NAL unit type of the NAL unit that identifies what type of data is carried in the NAL unit, the layer ID and the temporal ID for which the NAL unit belongs to. The NAL unit type is transmitted in the nal_unit_type codeword in the NAL unit header and the type indicates and defines how the NAL unit should be parsed and decoded. The rest of the bytes of the NAL unit is payload of the type indicated by the NAL unit type. A bitstream consists of a series of concatenated NAL units.

The syntax for the NAL unit header for HEVC is shown in Table 1.

TABLE 1

HEVC NAL unit header syntax

| | Descriptor |
|---|---|
| nal_unit_header( ) { | |
| forbidden_zero_bit | f(1) |
| nal_unit_type | u(6) |
| nuh_layer_id | u(6) |
| nuh_temporal_id_plus1 | u(3) |
| } | |

The syntax for the NAL unit header in the current version of the VVC draft is shown in Table 2.

TABLE 2

| VVC NAL unit header syntax | Descriptor |
|---|---|
| nal_unit_header( ) { | |
| forbidden_zero_bit | f(1) |
| nuh_reserved_zero_bit | u(1) |
| nuh_layer_id | u(6) |
| nal_unit_type | u(5) |
| nuh_temporal_id_plus1 | u(3) |
| } | |

The NAL unit types of the current VVC draft are shown in Table 3. The decoding order is the order in which NAL units shall be decoded, which is the same as the order of the NAL units within the bitstream. The decoding order may be different from the output order, which is the order in which decoded pictures are to be output, such as for display, by the decoder.

TABLE 3

NAL unit types in VVC

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 . . . 6 | RSV_VCL_4 . . . RSV_VCL_6 | Reserved non-IRAP VCL NAL unit types | VCL |
| 7<br>8 | IDR_W_RADL<br>IDR_N_LP | Coded slice of an IDR picture slice_layer_rbsp( ) | VCL |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11<br>12 | RSV_IRAP_11<br>RSV_IRAP_12 | Reserved IRAP VCL NAL unit types | VCL |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17<br>18 | PREFIX_APS_NUT<br>SUFFIX_APS_NUT | Adaptation parameter set adaptation_parameter_set_rbsp( ) | non-VCL |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23<br>24 | PREFIX_SEI_NUT<br>SUFFIX_SEI_NUT | Supplemental enhancement information sei_rbsp( ) | non-VCL |
| 25 | FD_NUT | Filler data filler_data_rbsp( ) | non-VCL |
| 26<br>27 | RSV_NVCL_26<br>RSV_NVCL_27 | Reserved non-VCL NAL unit types | non-VCL |
| 28...31 | UNSPEC_28 . . . UNSPEC_31 | Unspecified non-VCL NAL unit types | non-VCL |

6. Slices

The concept of slices in HEVC divides the picture into independently coded slices, where decoding of one slice in a picture is independent of other slices of the same picture. Different coding types could be used for slices of the same picture, i.e. a slice could either be an I-slice, P-slice or B-slice. One purpose of slices is to enable resynchronization in case of data loss. In HEVC, a slice is a set of CTUs.

In the current version of VVC, a picture may be partitioned into either raster scan slices or rectangular slices. A raster scan slice consists of a number of complete tiles in raster scan order. A rectangular slice consists of a group of tiles that together occupy a rectangular region in the picture or a consecutive number of CTU rows inside one tile. Each slice has a slice header comprising syntax elements. Decoded slice header values from these syntax elements are used when decoding the slice. Each slice is carried in one VCL NAL unit. In a previous version of the VVC draft specification, slices were referred to as tile groups.

7. Picture Header

The current VVC draft includes a picture header (PH), which is a non-VCL NAL unit having nal_unit_type equal to PH_NUT. The picture header is similar to the slice header, but the values of the syntax elements in the picture header are used to decode all slices of one picture.

In the current version of VVC, the VCL NAL units of a coded picture may be preceded by a picture header. The picture header contains parameters that are common for all slices of the associated picture. Some of the parameters may be signaled in either the picture header or in the slice header of each slice in the picture conditioned on a presence flag signaled in the PPS. HEVC does not have picture headers. In the current version of VVC, either there is a picture header NAL unit for each picture, or the picture header syntax is present in the slice header. In the latter case, only one slice per picture is allowed. The picture header and picture header structure syntax in the current version of VVC is shown below in table 4 and table 5.

TABLE 4 picture header syntax in VVC

| | Descriptor |
|---|---|
| picture_header_rbsp( ) { | |
| picture_header_structure( ) | |
| rbsp_trailing_bits( ) | |
| } | |

TABLE 5 picture header structure syntax in VVC

| | Descriptor |
|---|---|
| picture_header_structure( ) { | |
| gdr_or_irap_pic_flag | u(1) |
| if( gdr_or_irap_pic_flag ) | |
| gdr_pic_flag | u(1) |
| ph_inter_slice_allowed_flag | u(1) |
| if( ph_inter_slice_allowed_flag ) | |
| ph_intra_slice_allowed_flag | u(1) |
| non_reference_picture_flag | u(1) |
| ph_pic_parameter_set_id | ue(v) |
| ph_pic_order_cnt_Isb***** | u(v) |
| if( gdr_or_irap_pic_flag ) | |
| no_output_of_prior_pics_flag | u(1) |
| if( gdr_pic_flag ) | |
| recovery_poc_cnt | ue(v) |
| for( i = 0; i < NumExtraPhBits; i++ ) | |
| ph_extra_bit[ i ] | u(1) |
| if( sps_poc_msb_flag ) { | |
| ph_poc_msb_present_flag | u(1) |
| if( ph_poc_msb_present_flag ) | |
| poc_msb_val | u(v) |
| } | |
| if( sps_alf_enabled_flag && alf_info_in_ph_flag ) { | |
| ph_alf_enabled_flag | u(1) |
| if( ph_alf_enabled_flag ) { | |
| ph_num_alf_aps_ids_luma | u(3) |
| for( i = 0; i < ph_num_alf_aps_ids_luma; i++ ) | |
| ph_alf_aps_id_luma[ i ] | u(3) |
| if( ChromaArrayType != 0 ) | |
| ph_alf_chroma_idc | u(2) |
| if( ph_alf_chroma_idc > 0 ) | |
| ph_alf_aps_id_chroma | u(3) |
| if( sps_ccalf_enabled_flag ) { | |
| ph_cc_alf_cb_enabled_flag | u(1) |
| if( ph_cc_alf_cb_enabled_flag ) | |
| ph_cc_alf_cb_aps_id | u(3) |
| ph_cc_alf_cr_enabled_flag | u(1) |
| if( ph_cc_alf_cr_enabled_flag ) | |
| ph_cc_alf_cr_aps_id | u(3) |
| } | |
| } | |
| } | |
| if( sps_lmcs_enabled_flag ) { | |
| ph_lmcs_enabled_flag | u(1) |
| if( ph_lmcs_enabled_flag ) { | |

TABLE 5-continued picture header structure syntax in VVC

| | Descriptor |
|---|---|
| ph_lmcs_aps_id | u(2) |
| if( ChromaArrayType != 0 ) | |
| ph_chroma_residual_scale_flag | u(1) |
| } | |
| } | |
| if( sps_scaling_list_enabled_flag ) { | |
| ph_scaling_list_present_flag | u(1) |
| if( ph_scaling_list_present_flag ) | |
| ph_scaling_list_aps_id | u(3) |
| } | |
| if( sps_virtual_boundaries_enabled_flag && !sps_virtual_boundaries_present_flag ) { | |
| ph_virtual_boundaries_present_flag | u(1) |
| if( ph_virtual_boundaries_present_flag ) { | |
| ph_num_ver_virtual_boundaries | u(2) |
| for( i = 0; i < ph_num_ver_virtual_boundaries; i++ ) | |
| ph_virtual_boundaries_pos_x[ i ] | u(13) |
| ph_num_hor_virtual_boundaries | u(2) |
| for( i = 0; i < ph_num_hor_virtual_boundaries; i++ ) | |
| ph_virtual_boundaries_pos_y[ i ] | u(13) |
| } | |
| } | |
| if( output_flag_present_flag ) | |
| pic_output_flag | u(1) |
| if( rpl_info_in_ph_flag ) | |
| ref_pic_lists( ) | |
| if( partition_constraints_override_enabled_flag ) | |
| partition_constraints_override_flag | u(1) |
| if( ph_intra_slice_allowed_flag ) { | |
| if( partition_constraints_override_flag ) { | |
| ph_log2_diff_min_qt_min_cb_intra_slice_luma | ue(v) |
| ph_max_mtt_hierarchy_depth_intra_slice_luma | ue(v) |
| if( ph_max_mtt_hierarchy_depth_intra_slice_luma != 0 ) { | |
| ph_log2_diff_max_bt_min_qt_intra_slice_luma | ue(v) |
| ph_log2_diff_max_tt_min_qt_intra_slice_luma | ue(v) |
| } | |
| if( qtbtt_dual_tree_intra_flag ) { | |
| ph_log2_diff_min_qt_min_cb_intra_slice_chroma | ue(v) |
| ph_max_mtt_hierarchy_depth_intra_slice_chroma | ue(v) |
| if( ph_max_mtt_hierarchy_depth_intra_slice_chroma != 0 ) { | |
| ph_log2_diff_max_bt_min_qt_intra_slice_chroma | ue(v) |
| ph_log2_diff_max_tt_min_qt_intra_slice_chroma | ue(v) |
| } | |
| } | |
| } | |
| if( cu_qp_delta_enabled_flag ) | |
| ph_cu_qp_delta_subdiv_intra_slice | ue(v) |
| if( pps_cu_chroma_qp_offset_list_enabled_flag ) | |
| ph_cu_chroma_qp_offset_subdiv_intra_slice | ue(v) |
| } | |
| if( ph_inter_slice_allowed_flag ) { | |
| if( partition_constraints_override_flag ) { | |
| ph_log2_diff_min_qt_min_cb_inter_slice | ue(v) |
| ph_max_mtt_hierarchy_depth_inter_slice | ue(v) |
| if( ph_max_mtt_hierarchy_depth_inter_slice != 0 ) { | |
| ph_log2_diff_max_bt_min_qt_inter_slice | ue(v) |
| ph_log2_diff_max_tt_min_qt_inter_slice | ue(v) |
| } | |
| } | |
| if( cu_qp_delta_enabled_flag ) | |
| ph_cu_qp_delta_subdiv_inter_slice | ue(v) |
| if( pps_cu_chroma_qp_offset_list_enabled_flag ) | |
| ph_cu_chroma_qp_offset_subdiv_inter_slice | ue(v) |
| if( sps_temporal_mvp_enabled_flag ) { | |
| ph_temporal_mvp_enabled_flag | u(1) |
| if( ph_temporal_mvp_enabled_flag && rpl_info_in_ph_flag ) { | |
| ph_collocated_from_l0_flag | u(1) |
| if( ( ph_collocated_from_l0_flag && num_ref_entries[ 0 ][ RplsIdx[ 0 ] ] > 1 ) \| \| ( !ph_collocated_from_l0_flag && num_ref_entries[ 1 ][ RplsIdx[ 1 ] ] > 1 ) ) | |
| ph_collocated_ref_idx | ue(v) |
| } | |
| } | |
| mvd_l1_zero_flag | u(1) |
| if( sps_fpel_mmvd_enabled_flag ) | |
| ph_fpel_mmvd_enabled_flag | u(1) |

TABLE 5-continued picture header structure syntax in VVC

| | Descriptor |
|---|---|
| if( sps_bdof_pic_present_flag ) | |
| ph_disable_bdof_flag | u(1) |
| if( sps_dmvr_pic_present_flag ) | |
| ph_disable_dmvr_flag | u(1) |
| if( sps_prof_pic_present_flag ) | |
| ph_disable_prof_flag | u(1) |
| if( ( pps_weighted_pred_flag \|\| pps_weighted_bipred_flag ) && wp_info_in_ph_flag ) | |
| pred_weight_table( ) | |
| } | |
| if( qp_delta_info_in_ph_flag ) | |
| ph_qp_delta | se(v) |
| if( sps_joint_cbcr_enabled_flag ) | |
| ph_joint_cbcr_sign_flag | u(1) |
| if( sps_sao_enabled_flag && sao_info_in_ph_flag ) { | |
| ph_sao_luma_enabled_flag | u(1) |
| if( ChromaArrayType != 0 ) | |
| ph_sao_chroma_enabled_flag | u(1) |
| } | |
| if( sps_dep_quant_enabled_flag ) | |
| ph_dep_quant_enabled_flag | u(1) |
| if( sps_sign_data_hiding_enabled_flag && !ph_dep_quant_enabled_flag ) | |
| pic_sign_data_hiding_enabled_flag | u(1) |
| if( deblocking_filter_override_enabled_flag && dbf_info_in_ph_flag ) { | |
| ph_deblocking_filter_override_flag | u(1) |
| if( ph_deblocking_filter_override_flag ) { | |
| ph_deblocking_filter_disabled_flag | u(1) |
| if( !ph_deblocking_filter_disabled_flag ) { | |
| ph_beta_offset_div2 | se(v) |
| ph_tc_offset_div2 | se(v) |
| ph_cb_beta_offset_div2 | se(v) |
| ph_cb_tc_offset_div2 | se(v) |
| ph_cr_beta_offset_div2 | se(v) |
| ph_cr_to_offset_div2 | se(v) |
| } | |
| } | |
| } | |
| if( picture_header_extension_present_flag ) { | |
| ph_extension_length | ue(v) |
| for( i = 0; i < ph_extension_length; i++) | |
| ph_extension_data_byte[ i ] | u(8) |
| } | |
| } | |

8. Slice Header

The current VVC draft includes, just like HEVC, a slice header (SH) for each slice. The slice header comprises parameters that are common for all tiles or CTU rows within a tile represented in the slice. In the current version of VVC, some header parameters may be either signaled in the picture header or in the slice header, conditioned on a presence flag signaled in the picture parameter set. In the current version of VVC, the picture header parameters may be signaled in the slice header conditioned on a flag picture_header_in_slice_header_flag which is signaled in the slice header. The slice header syntax in the current version of VVC is shown below in table 6.

TABLE 6 slice header syntax in VVC

| | Descriptor |
|---|---|
| slice_header( ) { | |
| picture_header_in_slice_header_flag | u(1) |
| if( picture_header_in_slice_header_flag ) | |
| picture_header_structure( ) | |
| if( subpic_info_present_flag ) | |
| slice_subpic_id | u(v) |
| if( ( rect_slice_flag && NumSlicesInSubpic[ CurrSubpicIdx ] > 1 ) \|\| ( !rect_slice_flag && NumTilesInPic > 1 ) ) | |
| slice_address | u(v) |
| for( i = 0; i < NumExtraPhBits; i++ ) | |
| sh_extra_bit[ i ] | u(1) |
| if( !rect_slice_flag && NumTilesInPic > 1 ) | |
| num_tiles_in_slice_minus1 | ue(v) |
| if( ph_inter_slice_allowed_flag ) | |
| slice_type | ue(v) |

TABLE 6-continued

<table>
<tr><th colspan="2">slice header syntax in VVC</th></tr>
<tr><th></th><th>Descriptor</th></tr>
<tr><td>if( sps_alf_enabled_flag && !alf_info_in_ph_flag ) {</td><td></td></tr>
<tr><td>slice_alf_enabled_flag</td><td>u(1)</td></tr>
<tr><td>if( slice_alf_enabled_flag ) {</td><td></td></tr>
<tr><td>slice_num_alf_aps_ids_luma</td><td>u(3)</td></tr>
<tr><td>for( i = 0; i < slice_num_alf_aps_ids_luma; i++ )</td><td></td></tr>
<tr><td>slice_alf_aps_id_luma[ i ]</td><td>u(3)</td></tr>
<tr><td>if( ChromaArrayType != 0 )</td><td></td></tr>
<tr><td>slice_alf_chroma_idc</td><td>u(2)</td></tr>
<tr><td>if( slice_alf_chroma_idc )</td><td></td></tr>
<tr><td>slice_alf_aps_id_chroma</td><td>u(3)</td></tr>
<tr><td>if( sps_ccalf_enabled_flag ) {</td><td></td></tr>
<tr><td>slice_cc_alf_cb_enabled_flag</td><td>u(1)</td></tr>
<tr><td>if( slice_cc_alf_cb_enabled_flag )</td><td></td></tr>
<tr><td>slice_cc_alf_cb_aps_id</td><td>u(3)</td></tr>
<tr><td>slice_cc_alf_cr_enabled_flag</td><td>u(1)</td></tr>
<tr><td>if( slice_cc_alf_cr_enabled_flag )</td><td></td></tr>
<tr><td>slice_cc_alf_cr_aps_id</td><td>u(3)</td></tr>
<tr><td>}</td><td></td></tr>
<tr><td>}</td><td></td></tr>
<tr><td>}</td><td></td></tr>
<tr><td>if( separate_colour_plane_flag = = 1 )</td><td></td></tr>
<tr><td>colour_plane_id</td><td>u(2)</td></tr>
<tr><td>if( !rpl_info_in_ph_flag && ( ( nal_unit_type != IDR_W_RADL && nal_unit_type !=</td><td></td></tr>
<tr><td>IDR_N_LP ) | | sps_idr_rpl_present_flag ) )</td><td></td></tr>
<tr><td>ref_pic_lists( )</td><td></td></tr>
<tr><td>if( ( rpl_info_in_ph_flag | | ( ( nal_unit_type != IDR_W_RADL && nal_unit_type !=</td><td></td></tr>
<tr><td>IDR_N_LP ) | | sps_idr_rpl_present_flag ) ) &&</td><td></td></tr>
<tr><td>( slice_type != I && num_ref_entries[ 0 ][ RplsIdx[ 0 ] ] > 1 ) | |</td><td></td></tr>
<tr><td>( slice_type = = B && num_ref_entries[ 1 ][ RplsIdx[ 1 ] ] > 1 ) ) {</td><td></td></tr>
<tr><td>num_ref_idx_active_override_flag</td><td>u(1)</td></tr>
<tr><td>if( num_ref_idx_active_override_flag )</td><td></td></tr>
<tr><td>for( i = 0; i < ( slice_type = = B ? 2: 1 ); i++ )</td><td></td></tr>
<tr><td>if( num_ref_entries[ i ][ RplsIdx[ i ] ] > 1 )</td><td></td></tr>
<tr><td>num_ref_idx_active_minus1[ i ]</td><td>ue(v)</td></tr>
<tr><td>}</td><td></td></tr>
<tr><td>if( slice_type != I ) {</td><td></td></tr>
<tr><td>if( cabac_init_present_flag )</td><td></td></tr>
<tr><td>cabac_init_flag</td><td>u(1)</td></tr>
<tr><td>if( ph_temporal_mvp_enabled_flag && !rpl_info_in_ph_flag ) {</td><td></td></tr>
<tr><td>if( slice_type = = B )</td><td></td></tr>
<tr><td>slice_collocated_from_I0_flag</td><td>u(1)</td></tr>
<tr><td>if( ( slice_collocated_from_I0_flag && NumRefIdxActive[ 0 ] > 1 ) | |</td><td></td></tr>
<tr><td>( ! slice_collocated_from_I0_flag && NumRefIdxActive[ 1 ] > 1 ) )</td><td></td></tr>
<tr><td>slice_collocated_ref_idx</td><td>ue(v)</td></tr>
<tr><td>}</td><td></td></tr>
<tr><td>if( !wp_info_in_ph_flag && ( ( pps_weighted_pred_flag && slice_type = = P ) | |</td><td></td></tr>
<tr><td>( pps_weighted_bipred_flag && slice_type = = B ) ) )</td><td></td></tr>
<tr><td>pred_weight_table( )</td><td></td></tr>
<tr><td>}</td><td></td></tr>
<tr><td>if( !qp_delta_info_in_ph_flag )</td><td></td></tr>
<tr><td>slice_qp_delta</td><td>se(v)</td></tr>
<tr><td>if( pps_slice_chroma_qp_offsets_present_flag ) {</td><td></td></tr>
<tr><td>slice_cb_qp_offset</td><td>se(v)</td></tr>
<tr><td>slice_cr_qp_offset</td><td>se(v)</td></tr>
<tr><td>if( sps_joint_cbcr_enabled_flag )</td><td></td></tr>
<tr><td>slice_joint_cbcr_qp_offset</td><td>se(v)</td></tr>
<tr><td>}</td><td></td></tr>
<tr><td>if( pps_cu_chroma_qp_offset_list_enabled_flag )</td><td></td></tr>
<tr><td>cu_chroma_qp_offset_enabled_flag</td><td>u(1)</td></tr>
<tr><td>if( sps_sao_enabled_flag && !sao_info_in_ph_flag ) {</td><td></td></tr>
<tr><td>slice_sao_luma_flag</td><td>u(1)</td></tr>
<tr><td>if( ChromaArrayType != 0 )</td><td></td></tr>
<tr><td>slice_sao_chroma_flag</td><td>u(1)</td></tr>
<tr><td>}</td><td></td></tr>
<tr><td>if( deblocking_filter_override_enabled_flag && !dbf_info_in_ph_flag )</td><td></td></tr>
<tr><td>slice_deblocking_filter_override_flag</td><td>u(1)</td></tr>
<tr><td>if( slice_deblocking_filter_override_flag ) {</td><td></td></tr>
<tr><td>slice_deblocking_filter_disabled_flag</td><td>u(1)</td></tr>
<tr><td>if( !slice_deblocking_filter_disabled_flag ) {</td><td></td></tr>
<tr><td>slice_beta_offset_div2</td><td>se(v)</td></tr>
<tr><td>slice_to_offset_div2</td><td>se(v)</td></tr>
<tr><td>slice_cb_beta_offset_div2</td><td>se(v)</td></tr>
<tr><td>slice_cb_tc_offset_div2</td><td>se(v)</td></tr>
</table>

TABLE 6-continued slice header syntax in VVC

```
                                                              Descriptor
      slice_cr_beta_offset_div2                               se(v)
      slice_cr_to_offset_div2                                 se(v)
    }
  }
  slice_ts_residual_coding_disabled_flag                      u(1)
  if( ph_lmcs_enabled_flag )
    slice_lmcs_enabled_flag                                   u(1)
  if( pic_scaling_list_enabled_flag )
    slice_scaling_list_present_flag                           u(1)
  if( NumEntryPoints > 0 ) {
    offset_len_minus1                                         ue(v)
    for( i = 0; i < NumEntryPoints; i++ )
      entry_point_offset_minus1[ i ]                          u(v)
  }
  if( slice_header_extension_present_flag ) {
    slice_header_extension_length                             ue(v)
    for( i = 0; i < slice_header_extension_length; i++)
      slice_header_extension_data_byte[ i ]                   u(8)
  }
  byte_alignment( )
}
```

9. Parameter Sets

HEVC specifies three types of parameter sets, the picture parameter set (PPS), the sequence parameter set (SPS) and the video parameter set (VPS). The PPS contains data that is common for a whole picture, the SPS contains data that is common for a coded video sequence (CVS) and the VPS contains data that is common for multiple CVSs.

VVC also uses these parameter set types. In VVC, there is also the adaptation parameter set (APS) and the decoding capability information (DCI) NAL unit. The APS may contain information that can be used for multiple slices and two slices of the same picture can use different APSes. The DCI consists of information specifying the "worst case" in terms of profile and level that the decoder will encounter in the entire bitstream. The picture parameter set syntax in the current version of VVC is shown below in table 7.

TABLE 7

PPS syntax

```
                                                              Descriptor
pic_parameter_set_rbsp( ) {
  pps_pic_parameter_set_id                                    ue(v)
  pps_seq_parameter_set_id                                    u(4)
  mixed_nalu_types_in_pic_flag                                u(1)
  pic_width_in_luma_samples                                   ue(v)
  pic_height_in_luma_samples                                  ue(v)
  pps_conformance_window_flag                                 u(1)
  if( pps_conformance_window_flag ) {
    pps_conf_win_left_offset                                  ue(v)
    pps_conf_win_right_offset                                 ue(v)
    pps_conf_win_top_offset                                   ue(v)
    pps_conf_win_bottom_offset                                ue(v)
  }
  scaling_window_explicit_signalling_flag                     u(1)
  if( scaling_window_explicit_signalling_flag ) {
    scaling_win_left_offset                                   ue(v)
    scaling_win_right_offset                                  ue(v)
    scaling_win_top_offset                                    ue(v)
    scaling_win_bottom_offset                                 ue(v)
  }
  output_flag_present_flag                                    u(1)
  subpic_id_mapping_in_pps_flag                               u(1)
  if( subpic_id_mapping_in_pps_flag ) {
    pps_num_subpics_minus1                                    ue(v)
    pps_subpic_id_len_minus1                                  ue(v)
    for( i = 0; i <= pps_num_subpic_minus1; i++ )
      pps_subpic_id[ i ]                                      u(v)
  }
  no_pic_partition_flag                                       u(1)
  if( !no_pic_partition_flag ) {
    pps_log2_ctu_size_minus5                                  u(2)
    num_exp_tile_columns_minus1                               ue(v)
    num_exp_tile_rows_minus1                                  ue(v)
    for( i = 0; i <= num_exp_tile_columns_minus1; i++ )
```

TABLE 7-continued

<table>
<tr><th colspan="2">PPS syntax</th></tr>
<tr><th></th><th>Descriptor</th></tr>
<tr><td>tile_column_width_minus1[ i ]</td><td>ue(v)</td></tr>
<tr><td>for( i = 0; i <= num_exp_tile_rows_minus1; i++ )</td><td></td></tr>
<tr><td>tile_row_height_minus1[ i ]</td><td>ue(v)</td></tr>
<tr><td>if( NumTilesInPic > 1 )</td><td></td></tr>
<tr><td>rect_slice_flag</td><td>u(1)</td></tr>
<tr><td>if( rect_slice_flag )</td><td></td></tr>
<tr><td>single_slice_per_subpic_flag</td><td>u(1)</td></tr>
<tr><td>if( rect_slice_flag && !single_slice_per_subpic_flag ) {</td><td></td></tr>
<tr><td>num_slices_in_pic_minus1</td><td>ue(v)</td></tr>
<tr><td>if( num_slices_in_pic_minus1 > 0 )</td><td></td></tr>
<tr><td>tile_idx_delta_present_flag</td><td>u(1)</td></tr>
<tr><td>for( i = 0; i < num_slices_in_pic_minus1; i++ ) {</td><td></td></tr>
<tr><td>if( Num TileColumns > 1 )</td><td></td></tr>
<tr><td>slice_width_in_tiles_minus1[ i ]</td><td>ue(v)</td></tr>
<tr><td>if( Num TileRows > 1 &&<br>( tile_idx_delta_present_flag | | tileIdx % NumTileColumns = = 0 ) )</td><td></td></tr>
<tr><td>slice_height_in_tiles_minus1[ i ]</td><td>ue(v)</td></tr>
<tr><td>if( slice_width_in_tiles_minus1[ i ] = = 0 &&<br>slice_height_in_tiles_minus1[ i ] = = 0 &&<br>RowHeight[ SliceTopLeftTileIdx[ i ] / NumTileColumns ] > 1 ) {</td><td></td></tr>
<tr><td>num_exp_slices_in_tile[ i ]</td><td>ue(v)</td></tr>
<tr><td>numExpSlicesInTile = num_exp_slices_in_tile[ i ]</td><td></td></tr>
<tr><td>for( j = 0; j < numExpSlicesInTile; j++ )</td><td></td></tr>
<tr><td>exp_slice_height_in_ctus_minus1[ j ]</td><td>ue(v)</td></tr>
<tr><td>i += NumSlicesInTile[ i ]</td><td></td></tr>
<tr><td>}</td><td></td></tr>
<tr><td>if( tile_idx_delta_present_flag && i < num_slices_in_pic_minus1 )</td><td></td></tr>
<tr><td>tile_idx_delta[ i ]</td><td>se(v)</td></tr>
<tr><td>}</td><td></td></tr>
<tr><td>}</td><td></td></tr>
<tr><td>loop_filter_across_tiles_enabled_flag</td><td>u(1)</td></tr>
<tr><td>loop_filter_across_slices_enabled_flag</td><td>u(1)</td></tr>
<tr><td>}</td><td></td></tr>
<tr><td>cabac_init_present_flag</td><td>u(1)</td></tr>
<tr><td>for( i = 0; i < 2; i++ )</td><td></td></tr>
<tr><td>num_ref_idx_default_active_minus1[ i ]</td><td>ue(v)</td></tr>
<tr><td>rpl1_idx_present_flag</td><td>u(1)</td></tr>
<tr><td>init_qp_minus26</td><td>se(v)</td></tr>
<tr><td>cu_qp_delta_enabled_flag</td><td>u(1)</td></tr>
<tr><td>pps_chroma_tool_offsets_present_flag</td><td>u(1)</td></tr>
<tr><td>if( pps_chroma_tool_offsets_present_flag ) {</td><td></td></tr>
<tr><td>pps_cb_qp_offset</td><td>se(v)</td></tr>
<tr><td>pps_cr_qp_offset</td><td>se(v)</td></tr>
<tr><td>pps_joint_cbcr_qp_offset_present_flag</td><td>u(1)</td></tr>
<tr><td>if( pps_joint_cbcr_qp_offset_present_flag )</td><td></td></tr>
<tr><td>pps_joint_cbcr_qp_offset_value</td><td>se(v)</td></tr>
<tr><td>pps_slice_chroma_qp_offsets_present_flag</td><td>u(1)</td></tr>
<tr><td>pps_cu_chroma_qp_offset_list_enabled_flag</td><td>u(1)</td></tr>
<tr><td>}</td><td></td></tr>
<tr><td>if( pps_cu_chroma_qp_offset_list_enabled_flag ) {</td><td></td></tr>
<tr><td>chroma_qp_offset_list_len_minus1</td><td>ue(v)</td></tr>
<tr><td>for( i = 0; i <= chroma_qp_offset_list_len_minus1; i++ ) {</td><td></td></tr>
<tr><td>cb_qp_offset_list[ i ]</td><td>se(v)</td></tr>
<tr><td>cr_qp_offset_list[ i ]</td><td>se(v)</td></tr>
<tr><td>if( pps_joint_cbcr_qp_offset_present_flag )</td><td></td></tr>
<tr><td>joint_cbcr_qp_offset_list[ i ]</td><td>se(v)</td></tr>
<tr><td>}</td><td></td></tr>
<tr><td>}</td><td></td></tr>
<tr><td>pps_weighted_pred_flag</td><td>u(1)</td></tr>
<tr><td>pps_weighted_bipred_flag</td><td>u(1)</td></tr>
<tr><td>deblocking_filter_control_present_flag</td><td>u(1)</td></tr>
<tr><td>if( deblocking_filter_control_present_flag ) {</td><td></td></tr>
<tr><td>deblocking_filter_override_enabled_flag</td><td>u(1)</td></tr>
<tr><td>pps_deblocking_filter_disabled_flag</td><td>u(1)</td></tr>
<tr><td>if( !pps_deblocking_filter_disabled_flag ) {</td><td></td></tr>
<tr><td>pps_beta_offset_div2</td><td>se(v)</td></tr>
<tr><td>pps_tc_offset_div2</td><td>se(v)</td></tr>
<tr><td>pps_cb_beta_offset_div2</td><td>se(v)</td></tr>
<tr><td>pps_cb_tc_offset_div2</td><td>se(v)</td></tr>
<tr><td>pps_cr_beta_offset_div2</td><td>se(v)</td></tr>
<tr><td>pps_cr_tc_offset_div2</td><td>se(v)</td></tr>
<tr><td>}</td><td></td></tr>
<tr><td>}</td><td></td></tr>
<tr><td>rpl_info_in_ph_flag</td><td>u(1)</td></tr>
<tr><td>if( deblocking_filter_override_enabled_flag )</td><td></td></tr>
<tr><td>dbf_info_in_ph_flag</td><td>u(1)</td></tr>
</table>

TABLE 7-continued

| PPS syntax | |
|---|---|
| | Descriptor |
| sao_info_in_ph_flag | u(1) |
| alf_info_in_ph_flag | u(1) |
| if( ( pps_weighted_pred_flag | | pps_weighted_bipred_flag ) && rpl_present_in_ph_flag ) | |
| wp_info_in_ph_flag | u(1) |
| qp_delta_info_in_ph_flag | u(1) |
| pps_ref_wraparound_enabled_flag | u(1) |
| if( pps_ref_wraparound_enabled_flag ) | |
| pps_ref_wraparound_offset | ue(v) |
| picture_header_extension_present_flag | u(1) |
| slice_header_extension_present_flag | u(1) |
| pps_extension_flag | u(1) |
| if( pps_extension_flag ) | |
| while( more_rbsp_data( ) ) | |
| pps_extension_data_flag | u(1) |
| rbsp_trailing_bits( ) | |
| } | |

2.1.10 VVC Block Structure

The draft VVC video coding standard uses a block structure referred to as quadtree plus binary tree plus ternary tree block structure (QTBT+TT) where each picture is first partitioned into square blocks called coding tree units (CTU). The size of all CTUs are identical. Each CTU is further partitioned into coding units (CU) that can have either square or rectangular shapes. The CTU is first partitioned by a quad tree structure, then it may be further partitioned with equally sized partitions either vertically or horizontally in a binary structure to form coding units (CUs). A block could thus have either a square or rectangular shape. The depth of the quad tree and binary tree can be set by the encoder in the bitstream. An example of dividing a CTU using QTBT is illustrated in FIG. 1. That is, FIG. 1 shows partitioning a CTU into CUs using QTBT. The ternary tree (TT) part adds the possibility to divide a CU into three partitions instead of two equally sized partitions; this increases the possibilities to use a block structure that better fits the content structure in a picture.

11. Deblocking Filter

After blocks have been reconstructed, deblocking is applied to reduce boundary artifacts between coded blocks.

Deblocking is first applied on vertical boundaries and then on horizontal boundaries. The boundaries are either transform block boundaries or prediction block boundaries. A deblocking filter boundary strength parameter (bS) is set for each boundary. If the value of bS is larger than 0, then deblocking may be applied. The larger the boundary strength is, the stronger filtering is applied. When it has been determined that the deblocking filter should be applied to a boundary, the deblocking process calculates the gradient on each side of the boundary to make a decision of how many samples should be modified on the respective side. The decision is denoted as either a "strong", "weak" or "long tap" deblocking filter decision. For example, the VVC strong/weak filter decision is illustrated in table 8 below and is checked for line 0 and line 3 when filtering the horizontal border between two blocks above/below each other.

TABLE 8

If $2*d_0$ is less than ( $\beta$ >> 2 ), Abs( $p_{3,0} - p_{0,0}$ ) + Abs( $q_{0,0} - q_{3,0}$ ) is less than ( $\beta$ >> 3 ) and Abs( $p_{0,0} - q_{0,0}$ ) is less than ( 5 * tC + 1 ) >> 1
&&
$2*d_3$ is less than ( $\beta$ >> 2 ), Abs( $p_{3,3} - p_{0,3}$ ) + Abs( $q_{0,3} - q_{3,3}$ ) is less than ( $\beta$ >> 3 ) and Abs( $p_{0,3} - q_{0,3}$ ) is less than ( 5 * tC + 1 ) >> 1
where $d_0 = abs(p_{0,0} - 2*p_{1,0} + p_{2,0}) + abs(q_{0,0} - 2*q_{1,0} + q_{2,0})$ and
$d_1 = abs(p_{0,3} - 2*p_{1,3} + p_{2,3}) + abs(q_{0,3} - 2*q_{1,3} + q_{2,3})$
If the strong/weak decision is true the strong filter is applied for line 0 to line 4 else the weak filter is applied.
Strong filter:
p0' = Clip3( p0 − 2 * tC, p0 + 2 * tC, ( p2 + 2 * p1 + 2 * p0 + 2 * q0 + q1 + 4 ) >> 3 )
p1' = Clip3( p1 − 2 * tC, p1 + 2 * tC, ( p2 + p1 + p0 + q0 + 2 ) >> 2 )
p2' = Clip3( p2 − 2 * tC, p2 + 2*tC, ( 2 * p3 + 3 * p2 + p1 + p0 + q0 + 4 ) >> 3 )
q0' = Clip3( q0 − 2 * tC, q0 + 2 * tC, ( p1 + 2 * p0 + 2 * q0 + 2 * q1 + q2 + 4 ) >> 3 )
q1' = Clip3( q1 − 2 * tC, q1 + 2 * tC, ( p0 + q0 + q1 + q2 + 2 ) >> 2 )
q2'= Clip3( q2 − 2 * tC, q2 + 2 * tC, ( p0 + q0 + q1 + 3 * q2 + 2 * q3 + 4 ) >> 3 )
Here p* belongs to a line of block P and p0 is closest to the block boundary to block Q and where q* belongs to a line of block Q and q0 is closest to block boundary to block P.
p3 p2 p1 p0 | q0 q1 q2 q3
Weak filter:
Δ = ( 9 * ( q0 − p0 ) − 3 * ( q1 − p1 ) + 8 ) >> 4
When Abs(Δ) is less than tC * 10, the following ordered steps apply:
The filtered sample values p0' and q0' are specified as follows:
Δ = Clip3( −tC, tC, Δ )
p0' = Clip1Y( p0 + Δ )
q0' = Clip1Y( q0 − Δ ).
The variables dp and dq are derived as follows:

TABLE 8-continued

```
dp = Abs(p2 − 2 * p1 + p0)
dq = Abs(q2 − 2 * q1 + q0)
When dp is less than ( β + ( β >> 1 ) ) >> 3, the variable dEp is set equal to 1.
When dq is less than ( β + ( β >> 1 ) ) >> 3, the variable dEq is set equal to 1.
When dEp is equal to 1, the filtered sample value p1' is specified as follows:
Δp = Clip3( −(tC >> 1 ), tC >> 1, ( ( ( p2 + p0 + 1 ) >> 1 ) − p1 + Δ ) >> 1 )
p1' = Clip1Y(p1 +Δp)
When dEq is equal to 1, the filtered sample value q1' is specified as follows:
Δq = Clip3( −(tC >> 1 ), tC >> 1, ( ( ( q2 + q0 + 1 ) >> 1 ) − q1 − Δ ) >> 1 )
q1' = Clip1Y( q1 + Δq )
```

The deblocking filter strength parameter is determined from a specified table based on the quantization parameter Q as table index. The quantization parameter Q is derived as: Q=Clip3(0, 63, qP+(slice_beta_offset_div2<<1)), where slice_beta_offset_div2 is the value of the syntax element slice_beta_offset_div2 for the slice that contains sample q0,0.

The deblocking filter strength parameter is determined from a specified table based on the quantization parameter Q as table index.

Q=Clip3 (0,65,qP+2*(bS-1)+(slice_tc_offset_div2<<1)), where slice_tc_offset_div2 is the value of the syntax element slice_tc_offset_div2 for the slice that contains sample q0,0.

Furthermore, qP specifies the average qp of the coding units which include the coding blocks containing the sample q0,0 and p0,0. bS specifies the boundary filtering strength.

The Derivation of threshold variables β' and tC' from input Q is shown in table 9 below.

TABLE 9

Derivation of threshold variables β' and tC' from input Q

| Q | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| β' | 0 | 0 | 0 | 0 | 0 | 0 | 0 | 0 | 0 | 0 | 0 | 0 | 0 | 0 | 0 | 0 | 6 |
| $t_c$' | 0 | 0 | 0 | 0 | 0 | 0 | 0 | 0 | 0 | 0 | 0 | 0 | 0 | 0 | 0 | 0 | 0 |
| Q | 17 | 18 | 19 | 20 | 21 | 22 | 23 | 24 | 25 | 26 | 27 | 28 | 29 | 30 | 31 | 32 | 33 |
| β' | 7 | 8 | 9 | 10 | 11 | 12 | 13 | 14 | 15 | 16 | 17 | 18 | 20 | 22 | 24 | 26 | 28 |
| $t_c$' | 0 | 3 | 4 | 4 | 4 | 4 | 5 | 5 | 5 | 5 | 7 | 7 | 8 | 9 | 10 | 10 | 11 |
| Q | 34 | 35 | 36 | 37 | 38 | 39 | 40 | 41 | 42 | 43 | 44 | 45 | 46 | 47 | 48 | 49 | 50 |
| β' | 30 | 32 | 34 | 36 | 38 | 40 | 42 | 44 | 46 | 48 | 50 | 52 | 54 | 56 | 58 | 60 | 62 |
| $t_c$' | 13 | 14 | 15 | 17 | 19 | 21 | 24 | 25 | 29 | 33 | 36 | 41 | 45 | 51 | 57 | 64 | 71 |
| Q | 51 | 52 | 53 | 54 | 55 | 56 | 57 | 58 | 59 | 60 | 61 | 62 | 63 | 64 | | 65 | |
| β' | 64 | 66 | 68 | 70 | 72 | 74 | 76 | 78 | 80 | 82 | 84 | 86 | 88 | — | | — | |
| $t_c$' | 80 | 89 | 100 | 112 | 125 | 141 | 157 | 177 | 198 | 222 | 250 | 280 | 314 | 352 | | 395 | |

In HEVC, the deblocking filter parameter offsets for β and tC that are applied to the Cb and Cr components are not signaled in the bitstream but set to be equal to the offsets that are applied to the luma component.

In VVC, the deblocking filter parameter offsets for β and tC that are applied to the Y, Cb and Cr components are separately signaled in the bitstream. As shown in the above table 9, the threshold variables β' and tC' that are applied to the Cb and Cr components are derived by using input Q as index.

Here, Q that is applied to the Cb component is derived as below from β and tC respectively:

Q=Clip3 (0, 63, qP+(slice_cb_beta_offset_div2<<1))

Q=Clip3 (0, 65, qP+2*(bS-1)+(slice_cb_tc_offset_div2<<1)).

Furthermore, Q that is applied to the Cr component is derived as below from β and tC respectively:

Q=Clip3 (0, 63, qP+(slice_cr_beta_offset_div2<<1))

Q=Clip3 (0, 65, qP+2*(bS-1)+(slice_cr_tc_offset_div2<<1)).

SUMMARY

In this document, we use the syntax elements in the picture parameter set (PPS), picture header (PH) and slice header (SH) as examples. Those syntax elements include: 1) deblocking parameter offsets for β and tC (divided by 2) that are applied to the three color components Y, Cb and Cr (these syntax elements are called "deblocking offsets"); 2) deblocking parameter offsets for β and tC (divided by 2) that are applied to the Cb and Cr color components (these syntax elements are called "chroma deblocking offsets"); and 3) deblocking parameter offsets for β and tC (divided by 2) that are applied to the luma component (these syntax elements are called "luma deblocking offsets").

1. General Syntax Construct Problem

In the current version of VVC, when a first syntax element (referred to as Syntax_A) is not signaled, the value of Syntax_A may be inferred to be equal to a first value. The first value may be either a constant value or the value of a second syntax element (referred to as Syntax_B). In other words, when Syntax_A is not signaled, the value of Syntax_A may not be inferred to be equal to the value of a third syntax element (referred to as Syntax_C).

2. Problems of Signaling Deblocking Related Syntax Elements

In the current version of VVC, the deblocking filter can be enabled/disabled by the syntax element pps_deblocking_filter_disable_flag, ph_deblocking_filter_disabled_flag and slice_deblocking_filter_disabled_flag in the PPS, PH and SH, respectively. When one of the flag is signaled and the value is equal to 0, the deblocking offsets are signaled in the PPS, PH and SH, respectively. When the deblocking offsets are not signaled in the stream, the values of the deblocking offsets are inferred as shown in table 10 below.

TABLE 10

The value inference of the deblocking offsets

| | Not present in PPS | Not present in PH | Not present in SH |
|---|---|---|---|
| beta_offset_div2 | pps_beta_offset_div2 = 0 | ph_beta_offset_div2 = pps_beta_offset_div2 | slice_beta_offset_div2 = ph_beta_offset_div2 |
| tc_offset_div2 | pps_tc_offset_div2 = 0 | ph_to_offset_div2 = pps_tc_offset_div2 | slice_tc_offset_div2 = ph_tc_offset_div2 |
| cb_beta_offset_div2 | pps_cb_beta_offset_div2 = 0 | ph_cb_beta_offset_div2 = pps_cb_beta_offset_div2 | slice_cb_beta_offset_div2 = ph_cb_beta_offset_div2 |
| cb_tc_offset_div2 | pps_cb_tc_offset_div2 = 0 | ph_cb_tc_offset_div2 = pps_cb_tc_offset_div2 | slice_cb_tc_offset_div2 = ph_cb_tc_offset_div2 |
| cr_beta_offset_div2 | pps_cr_beta_offset_div2 = 0 | ph_cr_beta_offset_div2 = pps_cr_beta_offset_div2 | slice_cr_beta_offset_div2 = ph_cr_beta_offset_div2 |
| cr_tc_offset_div2 | pps_cr_tc_offset_div2 = 0 | ph_cr_tc_offset_div2 = pps_cr_tc_offset_div2 | slice_cr_tc_offset_div2 = ph_cr_tc_offset_div2 |

Problem One:

In the current version of VVC, when pps_deblocking_filter_disable_flag is present in the PPS and the value is equal to 0, the deblocking offsets are signaled in the PPS. However, when a video source that is represented by the bitstream only comprises luma samples (monochrome video) or is coded using three separate color planes (separate_colour_plane_flag is equal to 1), the deblocking filter is not applied to the chroma components (Cb and Cr). A problem with the current version of VVC is that the chroma deblocking offsets in some cases have to be signaled in the PPS even though they will not be used in the decoding process which is an unnecessary bit-rate cost.

Problem Two:

In the current version of VVC, the deblocking offsets are signaled separately for the three color components to provide the flexibility of controlling the deblocking strength separately for each of the color components. However, one frequent deblocking filter setting uses the same deblocking strength for all color components. For instance, this has been the case for the common test conditions (CTC) that is used in the development of VVC, where the chroma deblocking offsets have the same values as the luma deblocking offsets. Signaling chroma deblocking offsets separately comes at an unnecessary bit-rate cost for this setting. Given that the deblocking offsets are signed integer 0-th order Exp-Golomb-coded syntax elements with range [−12, 12], the bit-rate cost becomes as shown in table 11 below:

TABLE 11

Bit cost for each of the deblocking offsets

| Bit cost | Value of the syntax elements |
|---|---|
| 1 | { 0 } |
| 3 | { −1, 1 } |
| 5 | { −3, −2, 2, 3 } |
| 7 | { −7, −6, −5, −4, 4, 5, 6, 7 } |
| 9 | { −12, −11, −10, −9, −8, 8, 9, 10, 11, 12 } |

When deblocking offsets are signaled in the PPS, PH or SH, the bit cost of chroma deblocking offsets is at least 4 bits and at most 36 bits. The bit cost is here calculated as the bit cost for the deblocking offset value shown in the above table times four, which is the number of chroma deblocking offsets syntax elements.

Problem Three:

In the current version of VVC, when the deblocking filter is enabled, it implies that the deblocking filter is enabled on all color components, e.g. Y, Cb and Cr. It is not possible to enable the deblocking filter on one or more color components and disable the deblocking filter for the remaining color components. For example, it is not possible to enable the deblocking filter on the luma component but disable the deblocking filter on the chroma components (Cb and Cr).

This disclosure proposes solutions to the above described problems.

According to a first aspect of the present disclosure, there is provided a method, performed by a decoder, for deriving a value for a first syntax element, Syntax_A. The method includes deriving a value D from at least a value for a fourth syntax element, Syntax_D and determining whether Syntax_A is present in a bitstream. The method also includes, as a result of determining that Syntax_A is not present in the bitstream, deriving the value for Syntax_A based on the value D. Deriving the value for Syntax_A based on the value D comprises: deriving the value for Syntax_A to be equal to a value B derived from at least a value for a second syntax element, Syntax_B if D is equal to X, otherwise deriving the value for Syntax_A to be equal to a value C derived from at least a value for a third syntax element, Syntax_C. The method also includes decoding a picture from the bitstream using the derived value for Syntax_A. Syntax_A is a syntax element for a chroma beta offset divided by 2 or a chroma threshold clipping (tC) offset divided by 2 of a first hierarchy level, Syntax_B is a syntax element for a chroma beta offset divided by 2 or a chroma tC offset divided by 2 of a second hierarchy level, Syntax_C is a syntax element for a luma beta offset divided by 2 or a luma tC offset divided by 2 of the first hierarchy level, and syntax_D is a syntax element for a chroma tool offsets present flag.

According to a second aspect of the present disclosure, there is provided a computer program comprising instructions which, when executed by processing circuitry, causes the processing circuitry to perform the method according to the first aspect.

According to a third aspect of the present disclosure, there is provided a carrier comprising the computer program according to the second aspect, wherein the carrier is one of an electronic signal, an optical signal, a radio signal, and a computer readable storage medium.

According to a fourth aspect of the present disclosure, there is provided an apparatus, the apparatus being adapted to perform the method according to the first aspect.

An advantage of the embodiments is to reduce bit-cost by inferring the value of a syntax element using the proposed inference method. Another advantage is to reduce the operation cost of deblocking filter in the decoder side by a deblocking filter enable/disable flag. Another advantage is to increase the flexibility of the deblocking filter control.

BRIEF DESCRIPTION OF THE DRAWINGS

The accompanying drawings, which are incorporated herein and form part of the specification, illustrate various embodiments.

DETAILED DESCRIPTION

Figure 1:
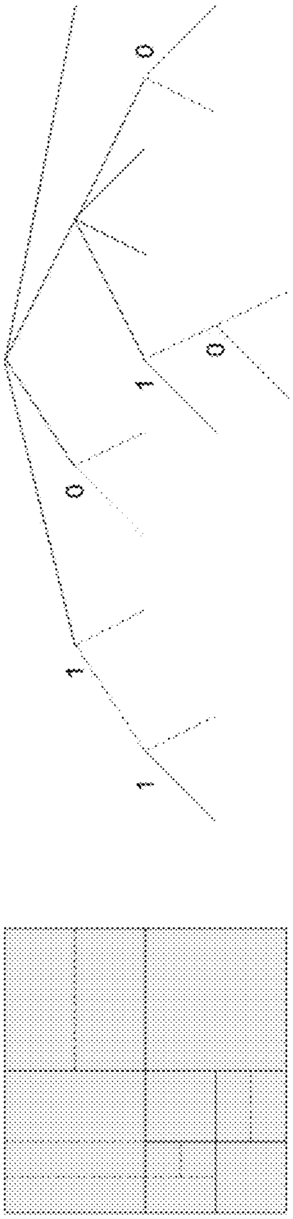
FIG. 1 illustrates an example of dividing a CTU.
Figure 2:
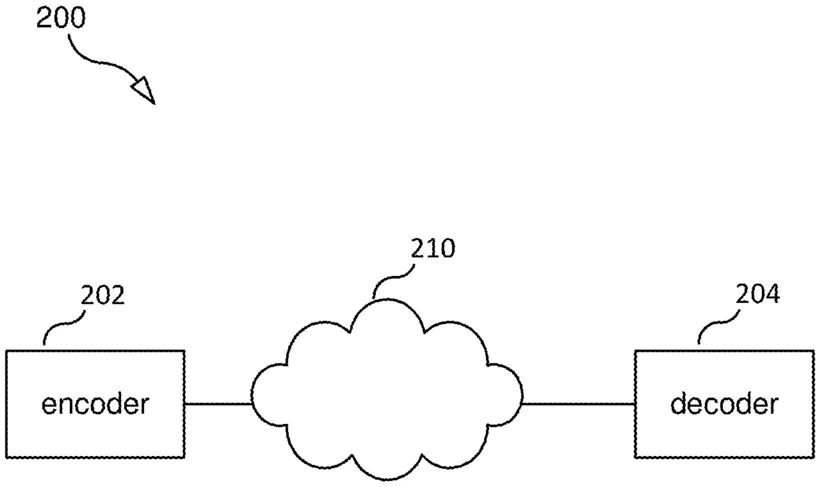
FIG. 2 illustrates a system according to an example embodiment.

FIG. 2 illustrates a system 200 according to an example embodiment. System 200 includes an encoder 202 in communication with a decoder 204 via a network 210 (e.g., the Internet or other network).

Figure 3:
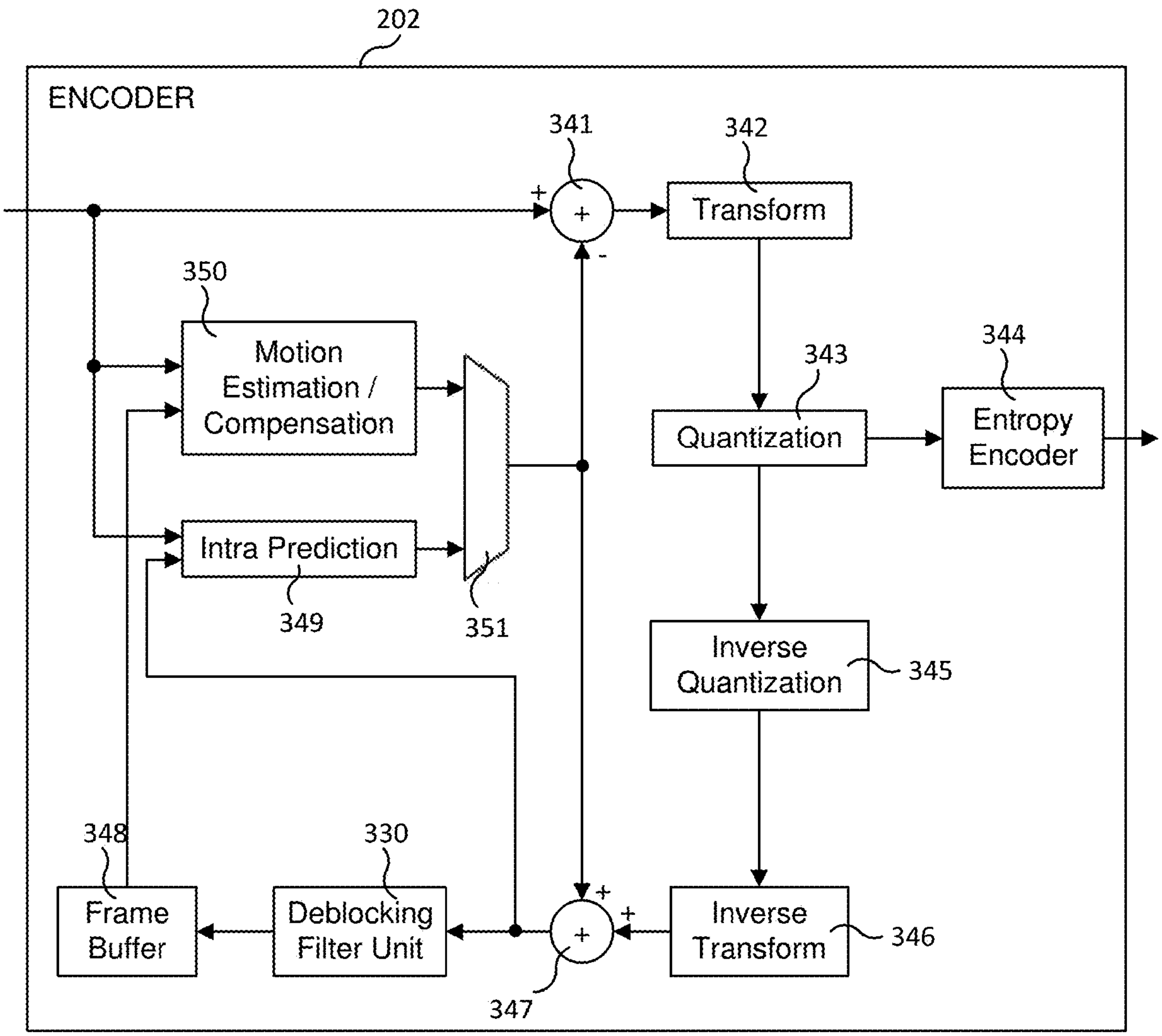
FIG. 3 is a schematic block diagram of encoder according to an embodiment.

FIG. 3 is a schematic block diagram of encoder 202 for encoding a block of pixel values (hereafter "block") in a video frame (picture) of a video sequence according to an embodiment. A current block is predicted by performing a motion estimation by a motion estimator 350 from an already provided block in the same frame or in a previous frame. The result of the motion estimation is a motion or displacement vector associated with the reference block, in the case of inter prediction. The motion vector is utilized by a motion compensator 350 for outputting an inter prediction of the block. An intra predictor 349 computes an intra prediction of the current block. The outputs from the motion estimator/compensator 350 and the intra predictor 349 are input in a selector 351 that either selects intra prediction or inter prediction for the current block. The output from the selector 351 is input to an error calculator in the form of an adder 341 that also receives the pixel values of the current block. The adder 341 calculates and outputs a residual error as the difference in pixel values between the block and its prediction. The error is transformed in a transformer 342, such as by a discrete cosine transform, and quantized by a quantizer 343 followed by coding in an encoder 344, such as by entropy encoder. In inter coding, also the estimated motion vector is brought to the encoder 344 for generating the coded representation of the current block. The transformed and quantized residual error for the current block is also provided to an inverse quantizer 345 and inverse transformer 346 to retrieve the original residual error. This error is added by an adder 347 to the block prediction output from the motion compensator 350 or the intra predictor 349 to create a reference block that can be used in the prediction and coding of a next block. This new reference block is first processed by a deblocking filter unit 330 according to the embodiments in order to perform deblocking filtering to combat any blocking artifact. The processed new reference block is then temporarily stored in a frame buffer 348, where it is available to the intra predictor 349 and the motion estimator/compensator 350.

Figure 4:
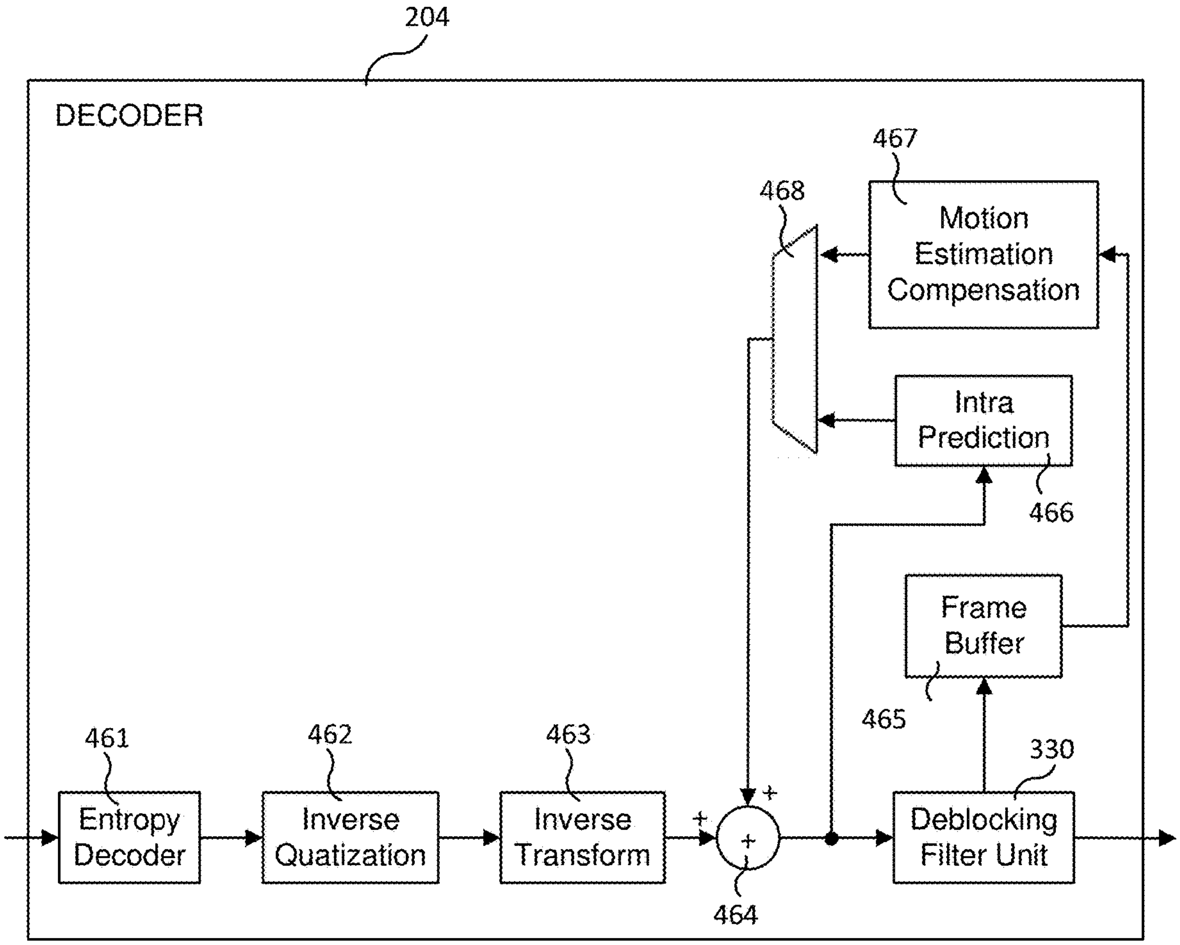
FIG. 4 is a schematic block diagram of encoder according to an embodiment.

FIG. 4 is a corresponding schematic block diagram of decoder 204 according to some embodiments. The decoder 204 comprises a decoder 461, such as entropy decoder, for decoding an encoded representation of a block to get a set of quantized and transformed residual errors. These residual errors are dequantized in an inverse quantizer 462 and inverse transformed by an inverse transformer 463 to get a set of residual errors. These residual errors are added in an adder 464 to the pixel values of a reference block. The reference block is determined by a motion estimator/compensator 467 or intra predictor 466, depending on whether inter or intra prediction is performed. A selector 468 is thereby interconnected to the adder 464 and the motion estimator/compensator 467 and the intra predictor 466. The resulting decoded block output form the adder 464 is input to a deblocking filter unit 330 according to the embodiments in order to deblocking filter any blocking artifacts. The filtered block is output form the decoder 504 and is furthermore preferably temporarily provided to a frame buffer 465 and can be used as a reference block for a subsequent block to be decoded. The frame buffer 465 is thereby connected to the motion estimator/compensator 467 to make the stored blocks of pixels available to the motion estimator/compensator 467. The output from the adder 464 is preferably also input to the intra predictor 466 to be used as an unfiltered reference block.

EMBODIMENTS

In the description below, various embodiments are described that solve one or more of the above described problems. It is to be understood by a person skilled in the art that two or more embodiments, or parts of embodiments, may be combined to form new solutions which are still covered by this disclosure.

Embodiment 1—a Method for Inferring a Syntax Element Value

In the first embodiment, a method is proposed for determining a value for a syntax element Syntax_A. When Syntax_A is not present, depending on a first condition, the value of Syntax_A is inferred to be equal to a value B, where the value B is derived from at least a value for a syntax element Syntax_B, and depending on a second condition, the value of Syntax_A is inferred to be a value C, where the value C is derived from at least a value for a syntax element Syntax_C. In other words, when Syntax_A is not present, the value of Syntax_A can be inferred from the value of at least two different syntax elements.

Accordingly, in one embodiment the method includes the following steps.

Determining a value of a first syntax element (namely Syntax_C). Determining a value of a second syntax element (namely Syntax_B). Determining a value of a third syntax element (namely Syntax_D). Determining whether a fourth syntax element (namely Syntax_A) is present or not in the bitstream.

When it is determined that Syntax_A is not present in the bitstream, then: if the determined value of Syntax_D is equal to a first value, the value of Syntax_A is inferred to be a value B, where the value B is derived from at least a determined value of Syntax_B, and if the determined value of Syntax_D is equal to a second value, the value of Syntax_A is inferred to be a value C, where the value C is derived from at least a value of Syntax_C.

In one embodiment, determining the value of Syntax_B and Syntax_C comprises: determining whether the syntax element is present or not in the bitstream; and, if the syntax element is determined not present in the bitstream, the value of the syntax element is inferred, otherwise, the value of the syntax element is decoded.

In one embodiment, determining the value of Syntax_D comprises determining whether the syntax element present or not in the bitstream. If Syntax_D is determined present in the bitstream, the determined value of Syntax_D is a first value, where, the first value is a condition (e.g. Syntax_D is present) or the first value is equal to the decoded value of Syntax_D (e.g. 0). If Syntax_D is not present in the bitstream, then the determined value of Syntax_D is a second value, where, the second value is a condition (e.g. Syntax_D is not present) or the second value is equal to be an inferred value (e.g. 2).

The syntax elements Syntax_A, Syntax_B, Syntax_C, and Syntax_D may be syntax elements in one or several header or parameter sets.

Figure 5:
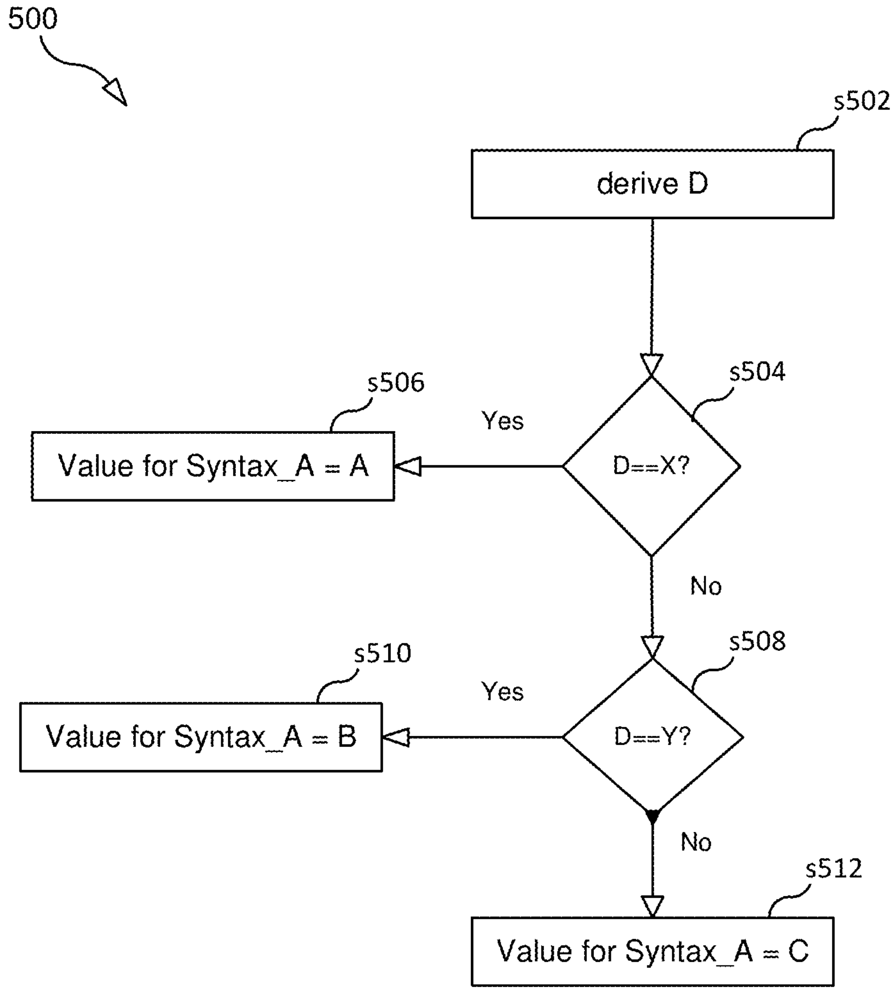
FIG. 5 is a flowchart illustrating a process according to an embodiment.

FIG. 5 is a flowchart illustrating a process 500 for deriving a value for a syntax element (Syntax_A) according to the above description. Process 500 may be performed by a decoder.

Step s502 comprises deriving a value (D). In one embodiment, deriving D comprises: i) setting D=X (e.g., 1) if a certain syntax element (Syntax_D) is present in the bitstream and Syntax_D indicates that Syntax_A is included in the bitstream, ii) setting D=Y (e.g., 0) if Syntax_D is present in the bitstream and Syntax_D indicates that Syntax_A is not included in the bitstream, or iii) otherwise setting D such that D does not equal either X or Y (e.g., setting D equal to Z).

Step s504 comprises determining whether D equals X. If D equals X, the process goes to step s506, otherwise the process goes to step s508.

Step s506 comprises setting the value for Syntax_A equal to a value A, where the value A is the decoded value of Syntax_A.

Step s508 comprises determining whether D equals Y. If D equals Y, the process goes to step s510, otherwise the process goes to step s512.

Step s510 comprises setting the value for Syntax_A equal to a value B, where the value B is a value associated with Syntax_B (e.g., B may be equal to the decoded value of Syntax_B).

Step s512 comprises setting the value for Syntax_A equal to a value C, where the value C is a value associated with Syntax_C (e.g., C may be equal to the decoded value of Syntax_C).

Figure 6:
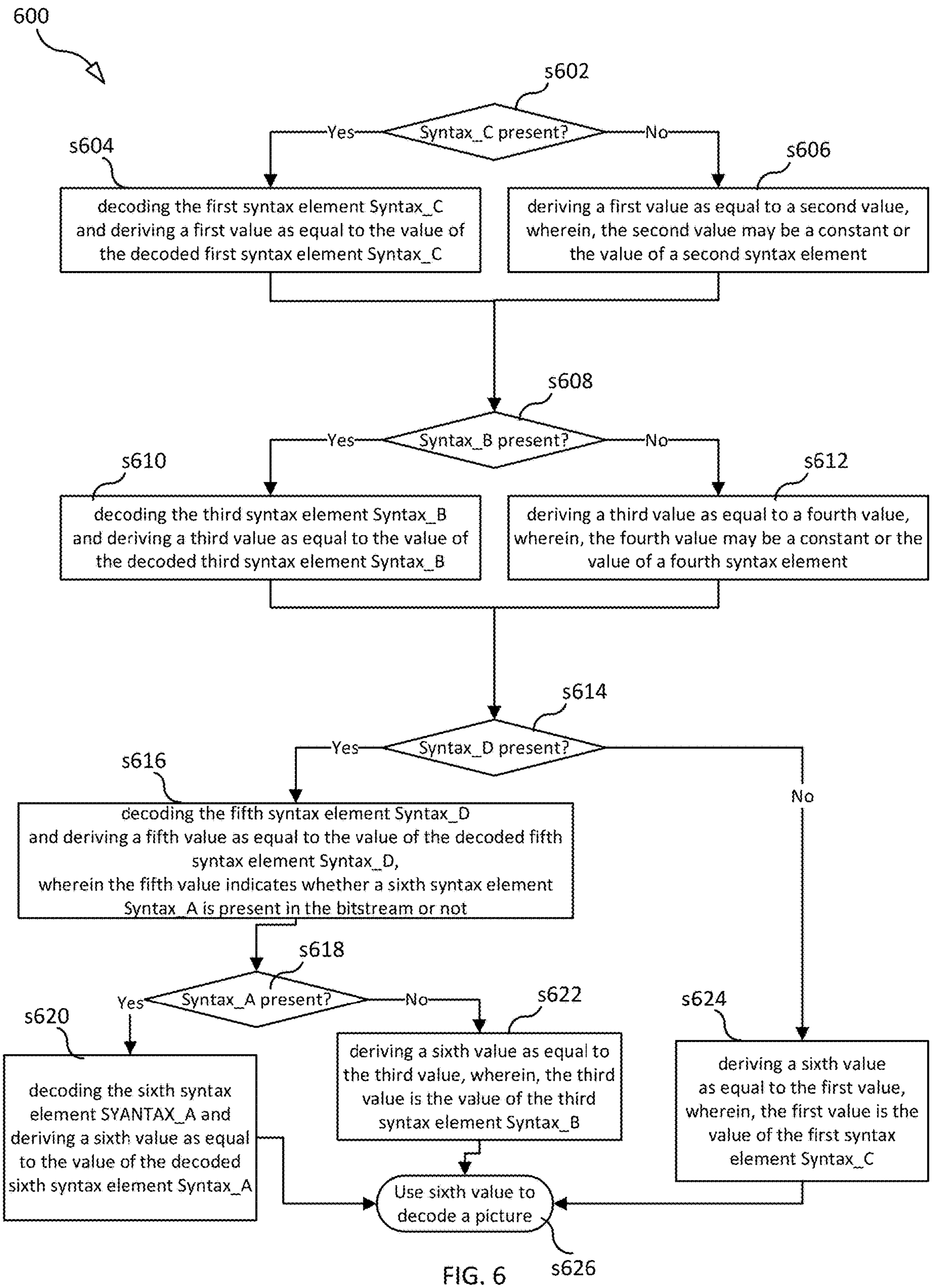
FIG. 6 is a flowchart illustrating a process according to an embodiment.

FIG. 6 is a flowchart illustrating a process 600 for deriving a value for a syntax element (Syntax_A) (a.k.a., the "sixth" syntax element). Process 600 may be performed by a decoder.

Step s602 comprises determining whether a first syntax element Syntax_C is present in the bitstream or not. If Syntax_C is present, the process goes to step s604, otherwise it goes to step s606.

Step s604 (Syntax_C present) comprises decoding the first syntax element Syntax_C and deriving a first value as equal to the value of the decoded first syntax element Syntax_C.

Step s606 (Syntax_C not present) comprises deriving the first value as equal to a second value, wherein, the second value may be a constant value, or the second value may be the value of a second syntax element.

Step s608 comprises determining whether a third syntax element Syntax_B is present in the bitstream or not. If Syntax_B is present, the process goes to step s610, otherwise it goes to step s612.

Step s610 (Syntax_B present) comprises decoding the third syntax element Syntax_B and deriving a third value as equal to the value of the decoded third syntax element Syntax_B.

Step s612 (Syntax_B not present) comprises deriving the third value as equal to a fourth value, wherein, the fourth value may be a constant value, or the fourth value may be the value of a fourth syntax element.

Step s614 comprises determining whether a fifth syntax element Syntax_D is present in the bitstream or not. If Syntax_D is present, the process goes to step s616, otherwise it goes to step s624.

Step s616 (Syntax_D present) comprises decoding the fifth syntax element Syntax_D and deriving a fifth value as equal to the value of the decoded fifth syntax element Syntax_D, wherein, the fifth value indicates whether a sixth syntax element Syntax_A is present in the bitstream or not.

Step s618 comprises determining, based on the fifth value, whether or not Syntax_A is present in the bitstream or not. If Syntax_A is present, the process goes to step s620, otherwise it goes to step s622.

Steps s620 (Syntax_A is present) comprises decoding the sixth syntax element Syntax_A and deriving a sixth value as equal to the value of the decoded sixth syntax element Syntax_A.

Step s622 (Syntax_A not present) comprises deriving the sixth value as equal to the third value, wherein, the third value is the value of the third syntax element Syntax_B.

Step s624 (Syntax_D not present) comprises deriving the sixth value as equal to the first value, wherein, the first value is the value of the first syntax element Syntax_C.

Step s626 comprises using the sixth value in a process to decode a picture wherein the Syntax_A, Syntax_B, Syntax_C, Syntax_D are four different syntax elements.

Figure 7:
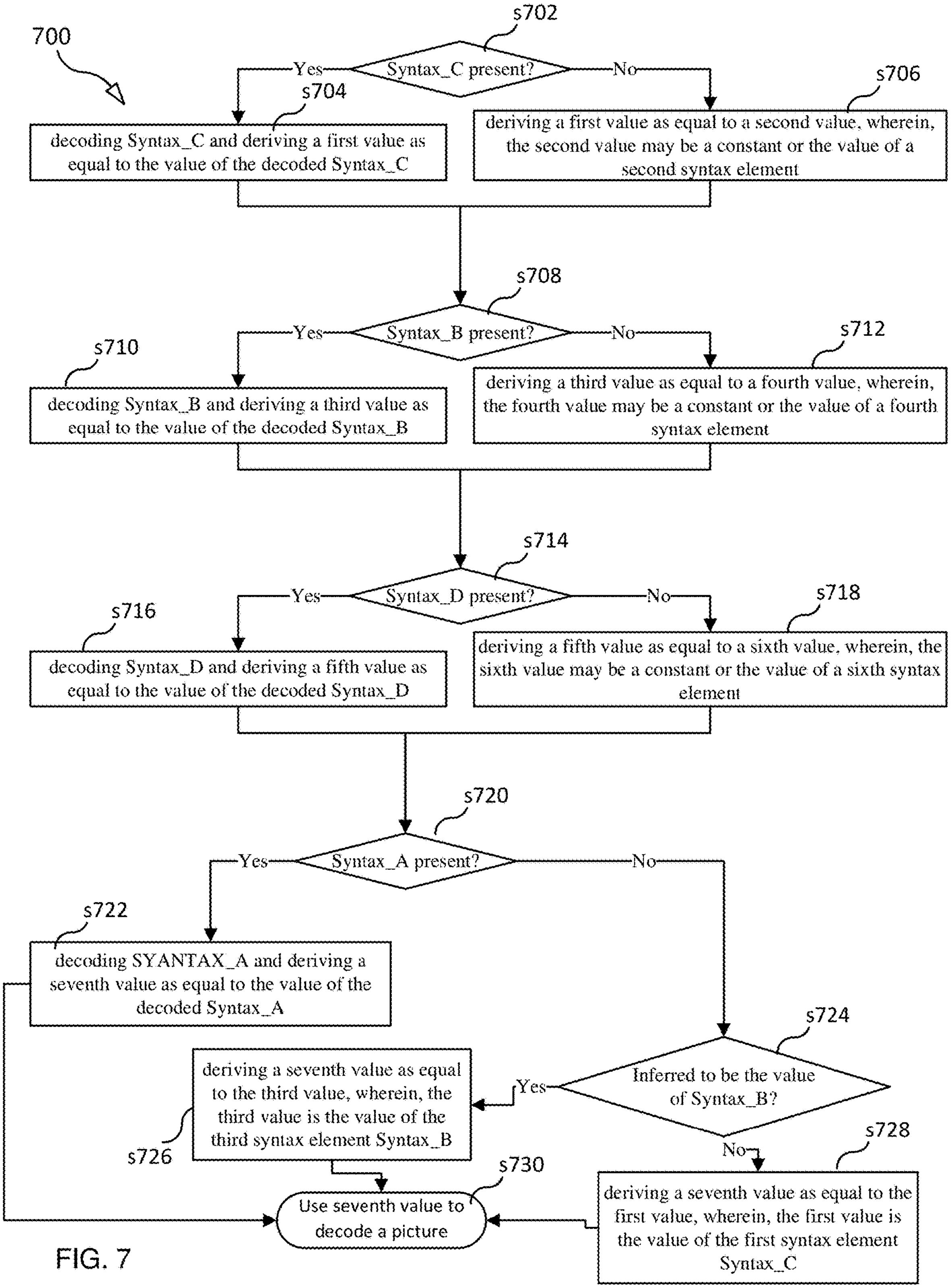
FIG. 7 is a flowchart illustrating a process according to an embodiment.

FIG. 7 is a flowchart illustrating a process 700 for inferring a value for a syntax element (Syntax_A). Process 700 may be performed by a decoder.

Step s702 comprises determining whether a first syntax element Syntax_C is present in the bitstream or not. If Syntax_C is present, the process goes to step s704, otherwise it goes to step s706.

Step s704 (Syntax_C present) comprises decoding the first syntax element Syntax_C and deriving a first value as equal to the value of the decoded first syntax element Syntax_C.

Step s706 (Syntax_C not present) comprises deriving the first value as equal to a second value, wherein, the second value may be a constant value, or the second value may be the value of a second syntax element.

Step s708 comprises determining whether a third syntax element Syntax_B is present in the bitstream or not. If Syntax_B is present, the process goes to step s710, otherwise it goes to step s712.

Step s710 (Syntax_B present) comprises decoding the third syntax element Syntax_B and deriving a third value as equal to the value of the decoded third syntax element Syntax_B.

Step s712 (Syntax_B not present) comprises deriving the third value as equal to a fourth value, wherein, the fourth value may be a constant value, or the fourth value may be the value of a fourth syntax element.

Step s714 comprises determining whether a fifth syntax element Syntax_D is present in the bitstream or not. If Syntax_D is present, the process goes to step s716, otherwise it goes to step s718.

Step s716 (Syntax_D present) comprises decoding the fifth syntax element Syntax_D and deriving a fifth value as equal to the value of the decoded fifth syntax element Syntax_D, wherein, the fifth value indicates whether a sixth syntax element Syntax_A is present in the bitstream or not.

Step s718 (Syntax_D not present) comprises deriving the fifth value as equal to a sixth value, wherein, the sixth value may be a constant value, or the sixth value may be the value of a sixth syntax element.

Step s702 comprises determining, based on the fifth value, whether a seventh syntax element Syntax_A is present in the bitstream or not (e.g., if the fifth value is equal to a value of X (e.g., X=1), then this specifies that Syntax_A is present in the bitstream. If Syntax_A is present, the process goes to step s722, otherwise it goes to step s724.

Step s722 (Syntax_A is present) comprises decoding the seventh syntax element Syntax_A and deriving a seventh value as equal to the value of the decoded seventh syntax element Syntax_A.

Step s724 (Syntax_A is not present) comprises determining whether the fifth value is equal to a ninth value (denoted Y). If the fifth value equals Y, then the value of the seventh syntax element Syntax_A should be inferred as equal to the value of the third syntax element Syntax_B. If the fifth value equals Y, then the process goes to step s726, otherwise it goes to step s728.

Step s726 comprises deriving the seventh value as equal to the third value, wherein, the third value is the value of the third syntax element Syntax_B.

Step s728 comprises deriving the seventh value as equal to the first value, wherein, the first value is the value of the first syntax element Syntax_C.

Step s730 comprises using the seventh value in a process to decode the picture wherein the Syntax_A, Syntax_B, Syntax_C, Syntax_D are four different syntax elements.

Use Case 1 (FIG. 8) Inferring the Value of Chroma Deblocking Offsets in the PH In this use case, a presence flag (which corresponds to Syntax_D described above) is added to the PH indicating whether the chroma deblocking offsets (which correspond to Syntax_A) are present in the PH or not. The flag may for instance be called ph_deblocking_chroma_offsets_present_flag. When the proposed flag is equal to a first value (e.g. 1), it is determined that the chroma deblocking offsets are signaled in the bitstream. When the proposed flag is present and the value of the flag is equal to a second value (e.g. 0), it is determined that the chroma deblocking offsets are not signaled but set to be equal to the values of the luma deblocking offsets in the PH. When the proposed flag is not present, it is determined that the chroma deblocking offsets are not signaled but should be set to be equal to the values of chroma deblocking offsets in the PPS.

The proposed method in this uses case is based on embodiment 1 in the way that when Syntax_A is not present, and the determined value of Syntax_D is equal to a first value (e.g. the first value is that Syntax_D is present), the value of Syntax_A is inferred to be the value of Syntax_B, if the determined value of Syntax_D is equal to a second value (e.g. the second value is that Syntax_D is not present), the value of Syntax_A is inferred to be the value of Syntax_C, wherein the Syntax_A represents one of the four syntax elements:

ph_cb_beta_offset_div2, ph_cb_tc_offset_div2, ph_cr_beta_offset_div2 or ph_cr_tc_offset_div2. Below we have set Syntax_A equal to the ph_cb_beta_offset_div2 syntax element as an example to show the syntax construct pseudo code:

TABLE 12

```
if ( Syntax_D == 1 ) {
  // Syntax_D and Syntax_A are present in the bitstream
  Syntax_A = decoded value of Syntax_A in the bitstream
}
else // Syntax_A is not present in the bitstream
{
  if ( Syntax_D is present ) {
    Syntax_A = Syntax_B
  }
  else // Syntax_D is not present
  {
    Syntax_A = Syntax_C
  }
}
Where,
      Syntax_A = ph_cb_beta_offset_div2
      Syntax_B = ph_beta_offset_div2
      Syntax_C = pps_cb_beta_offset_div2
      Syntax_D = ph_deblocking_chroma_offsets_present_flag
```

In another version of this embodiment, at least one of Syntax_B, Syntax_C and Syntax_D is a constant value In another version of this embodiment, at least one of Syntax_B, Syntax_C and Syntax_D is a value derived from one or more syntax elements in the bitstream.

Below are example syntax and semantics for use case 1.

TABLE 13

| | Descriptor |
|---|---|
| pic_parameter_set_rbsp( ) { | |
| ... | ... |
| deblocking_filter_control_present_flag | u(1) |
| if( deblocking_filter_control_present_flag ) { | |
| deblocking_filter_override_enabled_flag | u(1) |
| pps_deblocking_filter_disabled_flag OR pps_deblocking_filter_enabled_flag | u(1) |
| if( !pps_deblocking_filter_disabled_flag OR pps_deblocking_filter_enabled_flag) { | |
| pps_beta_offset_div2 | se(v) |
| pps_tc_offset_div2 | se(v) |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |
| ... | ... |
| rbsp_trailing_bits( ) | |
| } | |

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0. In some embodiments, the pps_deblocking_filter_disabled_flag is replaced with the pps_deblocking_filter_enabled_flag, which is equivalent to !pps_deblocking_filter_disabled_flag. Accordingly, pps_deblocking_filter_enabled_flag equal to 0 specifies that the operation of deblocking filter is not applied for slices referring to the PPS in which slice_deblocking_filter_disabled_flag is not present; pps_deblocking_filter_enabled_flag equal to 1 specifies that the operation of the deblocking filter is applied for slices referring to the PPS in which slice_deblocking_filter_disabled_flag is not present. When not present, the value of pps_deblocking_filter_enabled_flag is inferred to be equal to 1.

pps_beta_offset_div2 and pps_tc_offset_div2 specify the default deblocking parameter offsets for β and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_beta_offset_div2 and pps_tc_offset_div2 shall both be in the range of −12 to 12, inclusive. When not present, the values of pps_beta_offset div2 and pps_tc_offset_div2 are both inferred to be equal to 0.

pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are both inferred to be equal to 0.

pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are both inferred to be equal to 0.

TABLE 14

| | Descriptor |
|---|---|
| picture_header_structure( ) { | |
| ... | ... |
| if( deblocking_filter_override_enabled_flag && dbf_info_in_ph_flag ) { | |
| ph_deblocking_filter_override_flag | u(1) |
| if( ph_deblocking_filter_override_flag ) { | |
| ph_deblocking_filter_disabled_flag OR ph_deblocking_filter_enabled_flag | u(1) |
| if( !ph_deblocking_filter_disabled_flag OR ph_deblocking_filter_enabled_flag) { | |
| ph_beta_offset_div2 | se(v) |
| ph_tc_offset_div2 | se(v) |
| if( ChromaArrayType != 0 ) { | |
| ph_deblocking_chroma_offsets_present_flag | u(1) |
| if( ph_deblocking_chroma_offsets_present_flag ) { | |
| ph_cb_beta_offset_div2 | se(v) |
| ph_cb_tc_offset_div2 | se(v) |
| ph_cr_beta_offset_div2 | se(v) |
| ph_cr_tc_offset_div2 | se(v) |
| } | |
| } | |
| } | |
| } | |
| } | |
| } | |

ph_deblocking_filter_override_flag equal to 1 specifies that deblocking parameters are present in the PH. ph_deblocking_filter_override_flag equal to 0 specifies that deblocking parameters are not present in the PH. When not present, the value of ph_deblocking_filter_override_flag is inferred to be equal to 0.

ph_deblocking_filter_disabled_flag equal to 1 specifies that the operation of the deblocking filter is not applied for the slices associated with the PH. ph_deblocking_filter_disabled_flag equal to 0 specifies that the operation of the deblocking filter is applied for the slices associated with the PH. When ph_deblocking_filter_disabled_flag is not present, it is inferred to be equal to pps_deblocking_filter_disabled_flag. In some embodiments, the ph_deblocking_filter_disabled_flag is replaced with the ph_deblocking_filter_enabled_flag which is equivalent to !ph_deblocking_filter_disabled_flag. Accordingly, ph_deblocking_filter_enabled_flag equal to 0 specifies that the operation of the deblocking filter is not applied for the slices associated with the PH; ph_deblocking_filter_enabled_flag equal to 1 specifies that the operation of the deblocking filter is applied for the slices associated with the PH. When ph_deblocking_filter_enabled_flag is not present, it is inferred to be equal to !pps_deblocking_filter_disabled_flag or it is inferred to be equal to pps_deblocking_filter_enabled_flag.

ph_beta_offset_div2 and ph_tc_offset_div2 specify the deblocking parameter offsets for β and tC (divided by 2) that are applied to the luma component for the slices associated with the PH. The values of ph_beta_offset_div2 and ph_tc_offset_div2 shall both be in the range of −12 to 12, inclusive. When not present, the values of ph_beta_offset_div2 and ph_tc_offset_div2 are inferred to be equal to pps_beta_offset_div2 and pps_tc_offset_div2, respectively.

ph_deblocking_chroma_offsets_present_flag equal to 1 specifies the presence of deblocking parameter offsets for β and tC (divided by 2) that are applied to the Cb and Cr components in the PH. ph_deblocking_chroma_offsets_present_flag equal to 0 specifies the absence of deblocking parameter offsets for β and tC (divided by 2) that are applied to the Cb and Cr components in the PH. When not present, the value of ph_deblocking_chroma_offsets_present_flag is inferred to be equal to 0.

ph_cb_beta_offset_div2 and ph_cb_tc_offset_div2 specify the deblocking parameter offsets for β and tC (divided by 2) that are applied to the Cb component for the slices associated with the PH. The values of ph_cb_beta_offset_div2 and ph_cb_tc_offset_div2 shall both be in the range of −12 to 12, inclusive. When not present, the values of ph_cb_beta_offset_div2 and ph_cb_tc_offset_div2 are inferred as follows: 1) when ph_deblocking_chroma_offsets_present_flag is present, the values of ph_cb_beta_offset_div2 and ph_cb_tc_offset_div2 are inferred to be equal to ph_beta_offset_div2 and ph_tc_offset_div2, respectively; and 2) when ph_deblocking_chroma_offsets_present_flag is not present, the values of ph_cb_beta_offset_div2 and ph_cb_tc_offset_div2 are inferred to be equal to pps_cb_beta_offset_div2 and pps_cb_tc_offset_div2, respectively.

ph_cr_beta_offset_div2 and ph_cr_tc_offset_div2 specify the deblocking parameter offsets for β and tC (divided by 2) that are applied to the Cr component for the slices associated with the PH. The values of ph_cr_beta_offset_div2 and ph_cr_tc_offset_div2 shall both be in the range of −12 to 12, inclusive. When not present, the values of ph_cr_beta_offset_div2 and ph_cr_tc_offset_div2 are inferred as follows: 1) when ph_deblocking_chroma_offsets_present_flag is present, the values of ph_cr_beta_offset_div2 and ph_cr_tc_offset_div2 are inferred to be equal to ph_beta_offset_div2 and ph_tc_offset_div2, respectively; and 2) when ph_deblocking_chroma_offsets_present_flag is not present, the values of ph_cr_beta_offset_div2 and ph_cr_tc_offset_div2 are inferred to be equal to pps_cr_beta_offset_div2 and pps_cr_tc_offset_div2, respectively.

Figure 8:
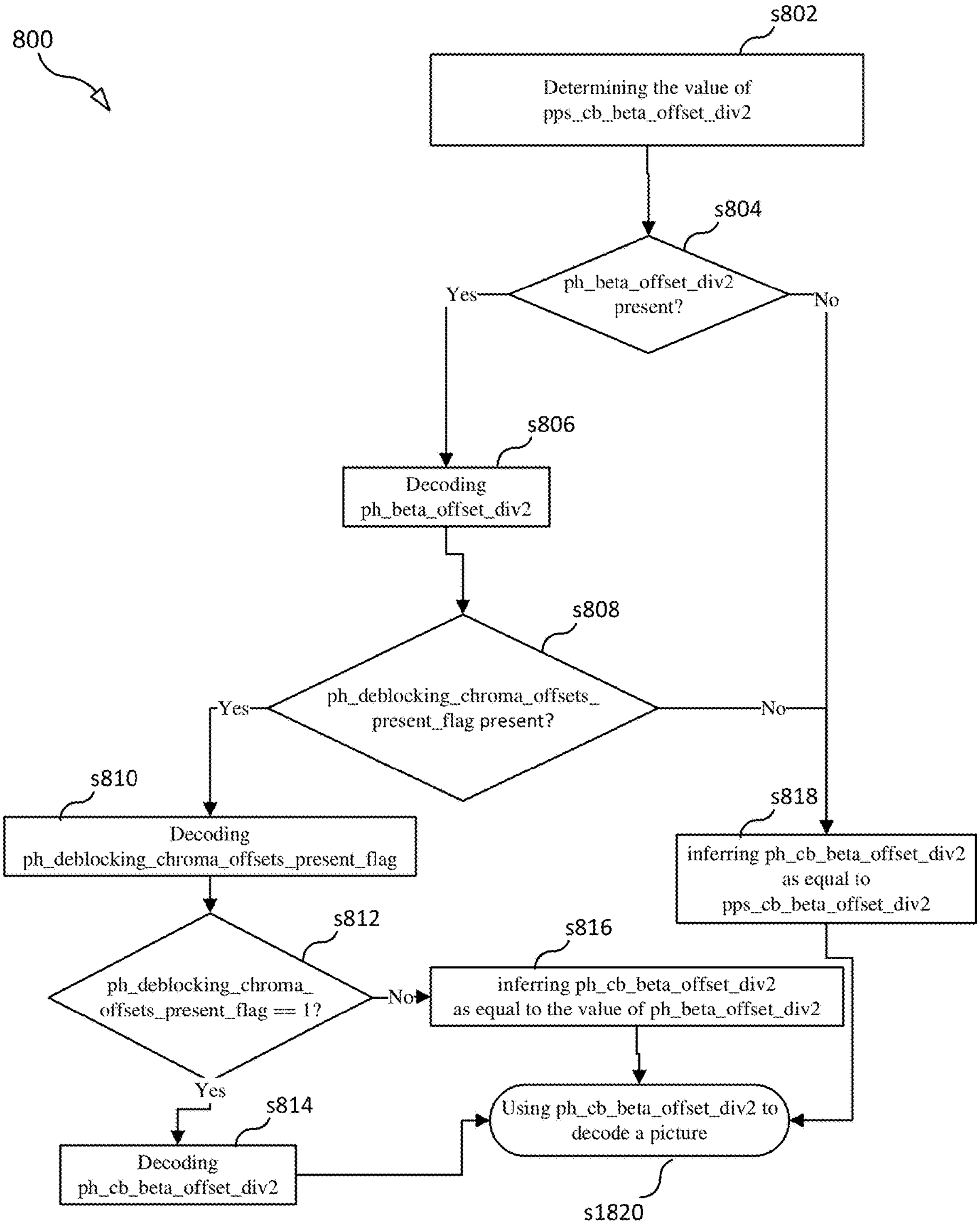
FIG. 8 is a flowchart illustrating a process according to an embodiment.

The construct can be explained by the following decoding flowchart shown in FIG. 8 referring to the syntax table 14 above.

Step s802 comprises determining the value of pps_cb_beta_offset_div2.

Step s804 comprises determining whether ph_beta_offset_div2 is present in the bitstream. If it is process 800 goes to step s806, otherwise it goes to step s818. In an alternative embodiment, step s804 comprises determining whether a certain flag (e.g., a ph_deblocking_filter_disabled_flag or a ph_deblocking_filter_enabled_flag) is equal to v1 or v2, where v1 is a first value and v2 is a second value and v2 does not equal v1. When certain flag is present and has a value equal to v1, process 800 goes to step s806, otherwise (the flag is either not present or present but has a value equal to v2), process 800 goes to step s818. In embodiments where the certain flag is the ph_deblocking_filter_disabled_flag, v1=0, and v2=1. In embodiments where the certain flag is the ph_deblocking_filter_enabled_flag, v1=1, and v2=0.

Step s806 comprises decoding ph_beta_offset_div2.

Step s808 comprises determining if ph_deblocking_chroma_offsets_present_flag is present in the bitstream. If it is, process 800 goes to step s810, otherwise it goes to step s818. In an alternative embodiment, step s808 comprises determining whether chromaArrayType is equal to 0 or not. When chromaArrayType is equal to 0, process 800 goes to step s818, otherwise (chromaArrayType is not equal to 0), process 800 goes to s810.

Step s810 comprises decoding the ph_deblocking_chroma_offsets_present_flag.

Step s812 comprises determining whether ph_deblocking_chroma_offsets_present_flag is equal to 1. If it is, then process 800 goes to step s814, otherwise it goes to step s816.

Step s814 comprises decoding ph_cb_beta_offset_div2.

Step s816 comprises inferring ph_cb_beta_offset_div2 as equal to the value of ph_beta_offset_div2.

Step s818 comprises inferring ph_cb_beta_offset_div2 as equal to the value of pps_cb_beta_offset_div2.

Use Case 2 (FIG. 9): Inferring the value of chroma deblocking offsets in the SH It is proposed to add a present flag to the SH indicating whether the chroma deblocking offsets are present in the SH or not. The flag may for instance be called slice_deblocking_chroma_offsets_present_flag. When the proposed flag is equal to a first value (e.g. 1), it is determined that the chroma deblocking offsets are signaled in the bitstream. When the proposed flag is present and the value of the flag equal to a second value (e.g. 0), it is determined that the chroma deblocking offsets are not signaled but set to be equal to the values of the luma deblocking offsets in the SH. When the proposed flag is not present, it is determined that the chroma deblocking offsets are not signaled but set to be equal to the values of chroma deblocking offsets in the PH.

The proposed method is based on embodiment 1 in the way that when Syntax_A is not present, and the determined value of Syntax_D is equal to a first value (e.g. the first value is that Syntax_D is present), the value of Syntax_A is inferred to be the value of Syntax_B, if the determined value of Syntax_D is equal to a second value (e.g. the second value is that Syntax_D is not present), the value of Syntax_A is inferred to be the value of Syntax_C, wherein the Syntax_A represents one of the four syntax elements: slice_cb_beta_offset_div2, slice_cb_tc_offset_div2, slice_cr_beta_offset_div2 or slice_cr_tc_offset_div2. Here we use Syntax_A represents slice_cb_beta_offset_div2 as an example to show the syntax construct pseudo code:

TABLE 15

```
if ( Syntax_D == 1)
{
  // Syntax_D and Syntax_A are present in the bitstream
  Syntax_A = decoded value of Syntax_A in the bitstream
}
else // Syntax_A is not present in the bitstream
{
```

TABLE 15-continued

```
  if ( Syntax_D is present)
  {
    Syntax_A = Syntax_B
  }
else // Syntax_D is not present
{
  Syntax_A = Syntax_C
}
}
Where,
Syntax_A = slice_cb_beta_offset_div2
Syntax_B = slice_beta_offset_div2
Syntax_C = ph_cb_beta_offset_div2
Syntax_D = slice_deblocking_chroma_offsets_present_flag
```

In another version of this embodiment, at least one of Syntax_B, Syntax_C and Syntax_D is a constant value, or a value derived from one or more syntax elements in the bitstream. Below are example syntax and semantics for this use case.

TABLE 16

| | Descriptor |
|---|---|
| pic_parameter_set_rbsp( ) { | |
| ... | ... |
| deblocking_filter_control_present_flag | u(1) |
| if( deblocking_filter_control_present_flag ) { | |
| deblocking_filter_override_enabled_flag | u(1) |
| pps_deblocking_filter_disabled_flag OR pps_deblocking_filter_enabled_flag | u(1) |
| if( !pps_deblocking_filter_disabled_flag OR pps_deblocking_filter_enabled_flag) { | |
| pps_beta_offset_div2 | se(v) |
| pps_tc_offset_div2 | se(v) |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |
| ... | ... |
| rbsp_trailing_bits( ) | |
| } | |

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0. As noted above, the pps_deblocking_filter_disabled_flag may be replaced with the pps_deblocking_filter_enbabled_flag. As noted above, the pps_deblocking_filter_disabled_flag may be replaced with the pps_deblocking_filter_enbabled_flag.

pps_beta_offset_div2 and pps_tc_offset_div2 specify the default deblocking parameter offsets for β and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_beta_offset_div2 and pps_tc_offset_div2 shall both be in the range of −12 to 12, inclusive. When not present, the values of pps_beta_offset_div2 and pps_tc_offset_div2 are both inferred to be equal to 0.

pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are both inferred to be equal to 0.

pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are both inferred to be equal to 0.

TABLE 17

| | Descriptor |
|---|---|
| slice_header( ) { | |
| ... | ... |
| if( deblocking_filter_override_enabled_flag && !dbf_info_in_ph_flag ) { | |
| slice_deblocking_filter_override_flag | u(1) |
| if( slice_deblocking_filter_override_flag ) { | |
| slice_deblocking_filter_disabled_flag OR slice_deblocking_filter_enabled_flag | u(1) |
| if( !slice_deblocking_filter_disabled_flag OR slice_deblocking_filter_enabled_flag) { | |
| slice_beta_offset_div2 | se(v) |
| slice_tc_offset_div2 | se(v) |
| if( ChromaArrayType != 0 ) { | |
| slice_deblocking_chroma_offsets_present_flag | u(1) |

TABLE 17-continued

| | Descriptor |
|---|---|
| if( slice_deblocking_chroma_offsets_present_flag ) { | |
| slice_cb_beta_offset_div2 | se(v) |
| slice_cb_tc_offset_div2 | se(v) |
| slice_cr_beta_offset_div2 | se(v) |
| slice_cr_tc_offset_div2 | se(v) |
| } | |
| } | |
| } | |
| } | |
| } | |
| } | |

slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to ph_deblocking_filter_override_flag.

slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When slice_deblocking_filter_disabled_flag is not present, it is inferred to be equal to ph_deblocking_filter_disabled_flag, or it is inferred to be equal to !ph_deblocking_filter_enabled_flag. The slice_deblocking_filter_disabled_flag may be replaced with the slice_deblocking_filter_enabled_flag, which is equivalent to!slice_deblocking_filter_disabled_flag.

slice_beta_offset_div2 and slice_tc_offset_div2 specify the deblocking parameter offsets for β and tC (divided by 2) that are applied to the luma component for the current slice. The values of slice_beta_offset_div2 and slice_to_offset_div2 shall both be in the range of −12 to 12, inclusive. When not present, the values of slice_beta_offset_div2 and slice_tc_offset_div2 are inferred to be equal to ph_beta_offset_div2 and ph_tc_offset_div2, respectively.

slice_deblocking_chroma_offsets_present_flag equal to 1 specifies the presence of deblocking parameter offsets for β and tC (divided by 2) that are applied to the Cb and Cr components in the slice header. slice_deblocking_chroma_offsets_present_flag equal to 0 specifies the absence of deblocking parameter offsets for β and tC (divided by 2) that are applied to the Cb and Cr components in the slice header. When not present, the value of slice_deblocking_chroma_offsets_present_flag is inferred to be equal to 0.

slice_cb_beta_offset_div2 and slice_cb_tc_offset_div2 specify the deblocking parameter offsets for β and tC (divided by 2) that are applied to the Cb component for the current slice. The values of slice_cb_beta_offset_div2 and slice_cb_tc_offset_div2 shall both be in the range of −12 to 12, inclusive. When not present, the values of slice_cb_beta_offset_div2 and slice_cb_tc_offset_div2 are inferred as follows: i) when slice_deblocking_chroma_offsets_present_flag is present, the values of slice_cb_beta_offset_div2 and slice_cb_tc_offset_div2 are inferred to be equal to slice_beta_offset_div2 and slice_tc_offset_div2, respectively; and 2) when slice_deblocking_chroma_offsets_present_flag is not present, the values of slice_cb_beta_offset_div2 and slice_cb_tc_offset_div2 are inferred to be equal to ph_cb_beta_offset_div2 and ph_cb_tc_offset_div2, respectively.

slice_cr_beta_offset_div2 and slice_cr_tc_offset_div2 specify the deblocking parameter offsets for β and tC (divided by 2) that are applied to the Cr component for the current slice. The values of slice_cr_beta_offset_div2 and slice_cr_tc_offset_div2 shall both be in the range of −12 to 12, inclusive. When not present, the values of slice_cr_beta_offset_div2 and slice_cr_tc_offset_div2 are inferred as follows: i) When slice_deblocking_chroma_offsets_present_ flag is present, the values of slice_cr_beta_offset_div2 and slice_cr_tc_offset_div2 are inferred to be equal to slice_beta_offset_div2 and slice_tc_offset_div2, respectively; and 2) When slice_deblocking_chroma_offsets_present_flag is not present, the values of slice_cr_beta_offset_div2 and slice_cr_tc_offset_div2 are inferred to be equal to ph_cr_beta_offset_div2 and ph_cr_tc_offset_div2, respectively.

Figure 9:
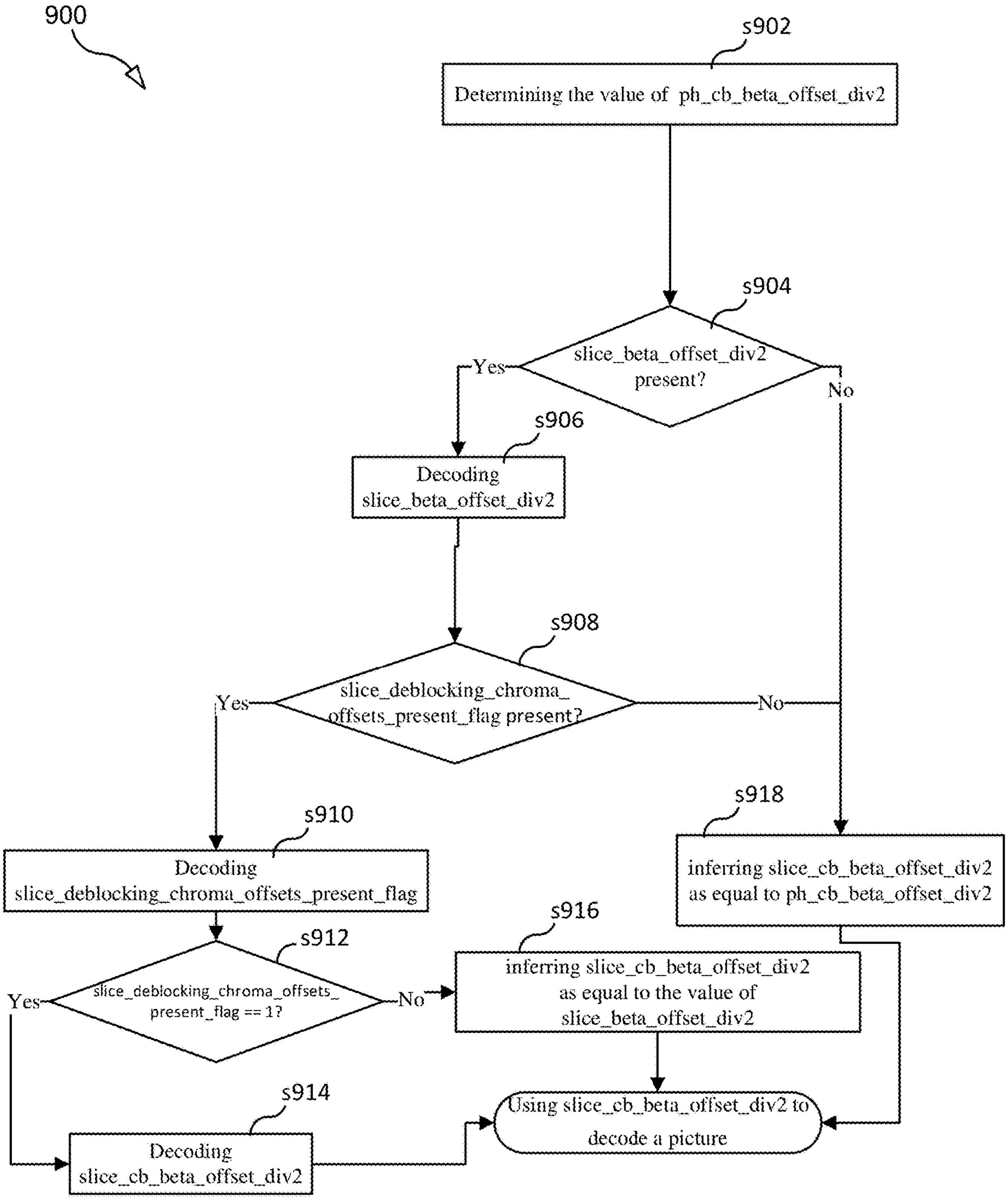
FIG. 9 is a flowchart illustrating a process according to an embodiment.

The construct can be explained by the following decoding flowchart shown in FIG. 9 referring to the syntax table above.

Step s902 comprises determining the value of ph_cb_beta_offset_div2.

Step s904 comprises determining whether slice_beta_offset_div2 is present in the bitstream. If it is process 900 goes to step s906, otherwise it goes to step s918. In an alternative embodiment, step s804 comprises determining whether a certain flag (e.g., a slice_deblocking_filter_disabled_flag or a slice_deblocking_filter_enabled_flag) is equal to v1 or v2, where v1 is a first value and v2 is a second value and v2 does not equal v1. When the certain flag is present and has a value equal to v1 (e.g., 0), process 900 goes to step s906, otherwise (the flag is either not present or present but has a value equal to v2), process 900 goes to step s918. In embodiments where the certain flag is the slice_deblocking_filter_disabled_flag, v1=0, and v2=1. In embodiments where the certain flag is the slice_deblocking_filter_enabled_flag, v1=1, and v2=0.

Step s906 comprises decoding slice_beta_offset_div2.

Step s908 comprises determining if slice_deblocking_chroma_offsets_present_flag is present in the bitstream. If it is, process 900 goes to step s910, otherwise it goes to step s918. In an alternative embodiment, step s904 comprises determining whether chromaArrayType is equal to 0 or 1. When chromaArrayType is equal to 0, process 900 goes to step s918, otherwise (chromaArrayType is not equal to 0), process 900 goes to s910.

Step s910 comprises decoding the slice_deblocking_chroma_offsets_present_flag.

Step s912 comprises determining whether slice_deblocking_chroma_offsets_present_flag is equal to 1. If it is, then process 900 goes to step s914, otherwise it goes to step s916.

Step s914 comprises decoding slice_cb_beta_offset_div2.

Step s916 comprises inferring slice_cb_beta_offset_div2 as equal to the value of slice_beta_offset_div2.

Step s918 comprises inferring slice_cb_beta_offset_div2 as equal to the value of ph_cb_beta_offset_div2.

Use Case 3—Inferring the Value of Chroma Deblocking Offsets in the PPS

It is proposed to add a present flag to the PPS indicating whether the chroma deblocking offsets are present in the PPS or not. The flag may for instance be called pps_deblocking_chroma_offsets_present_flag. When the proposed flag is equal to a first value (e.g. 1), it is determined that the chroma deblocking offsets are signaled in the bitstream. When the proposed flag is present and the value is equal to a second value (e.g. 0), it is determined that the chroma deblocking offsets are not signaled but set to be equal to the values of the luma deblocking offsets in the PPS. When the proposed flag is not present, it is determined that the chroma deblocking offsets are not signaled but set to be equal to 0.

Below are example syntax and semantics for this use case.

TABLE 18

| | Descriptor |
|---|---|
| pic_parameter_set_rbsp( ) { | |
| ... | ... |
| deblocking_filter_control_present_flag | u(1) |
| if( deblocking_filter_control_present_flag ) { | |
| deblocking_filter_override_enabled_flag | u(1) |
| pps_deblocking_filter_disabled_flag OR pps_deblocking_filter_enabled_flag | u(1) |
| if( !pps_deblocking_filter_disabled_flag OR pps_deblocking_filter_enabled_flag) { | |
| pps_beta_offset_div2 | se(v) |
| pps_tc_offset_div2 | se(v) |
| pps_deblocking_chroma_offsets_present_flag | u(1) |
| if( pps_deblocking_chroma_offsets_present_flag ) { | |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |
| } | |
| ... | ... |
| rbsp_trailing_bits( ) | |
| } | |

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.

pps_beta_offset_div2 and pps_tc_offset_div2 specify the default deblocking parameter offsets for β and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_beta_offset_div2 and pps_tc_offset_div2 shall both be in the range of −12 to 12, inclusive. When not present, the values of pps_beta_offset div2 and pps_tc_offset_div2 are both inferred to be equal to 0.

pps_deblocking_chroma_offsets_present_flag equal to 1 specifies the presence of deblocking parameter offsets for β and tC (divided by 2) that are applied to the Cb and Cr components in the PPS. pps_deblocking_chroma_offsets_present_flag equal to 0 specifies the absence of deblocking parameter offsets for β and tC (divided by 2) that are applied to the Cb and Cr components in the PPS. When not present, the value of pps_deblocking_chroma_offsets_present_flag is inferred to be equal to 0. When ChromaArrayType is equal to 0, the value of pps_deblocking_chroma_offsets_present_flag shall be equal to 0.

pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are inferred as follows: i) When pps_deblocking_chroma_offsets_present_flag is present, the values of pps_cb_beta_offset_div2 and pps_cb_tc_offset_div2 are inferred to be equal to pps_beta_offset_div2 and pps_tc_offset_div2, respectively; and 2) When pps_deblocking_chroma_offsets_present_flag is not present, the values of pps_cb_beta_offset_div2 and pps_cb_tc_offset_div2 are both inferred to be equal to 0.

pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are inferred as follows: 1) When pps_deblocking_chroma_offsets_present_flag is present, the values of pps_cr_beta_offset_div2 and pps_cr_tc_offset_div2 are inferred to be equal to pps_beta_offset_div2 and pps_tc_offset_div2, respectively; and 2) When pps_deblocking_chroma_offsets_present_flag is not present, the values of pps_cr_beta_offset_div2 and pps_cr_tc_offset_div2 are both inferred to be equal to 0.

This embodiment discloses a novel syntax construct and method for inferring values when syntax elements are not present. A novel element here is the way the value of a syntax element that is not present in the bitstream is inferred. In short, if the syntax element is present, the value is derived as equal to the value of the decoded syntax element. But if the syntax element is not present, the value is set equal to a value A or a value B depending on whether another syntax element is present in the bitstream or not.

Although the novel construct was above shown in a picture parameter set (PPS), this construct is not limited to the PPS. It may be used in e.g. a sequence parameter set, picture parameter set, slice header, video parameter set, decoding capability information, adaptation parameter set, supplemental enhancement information or picture header.

Figure 10:
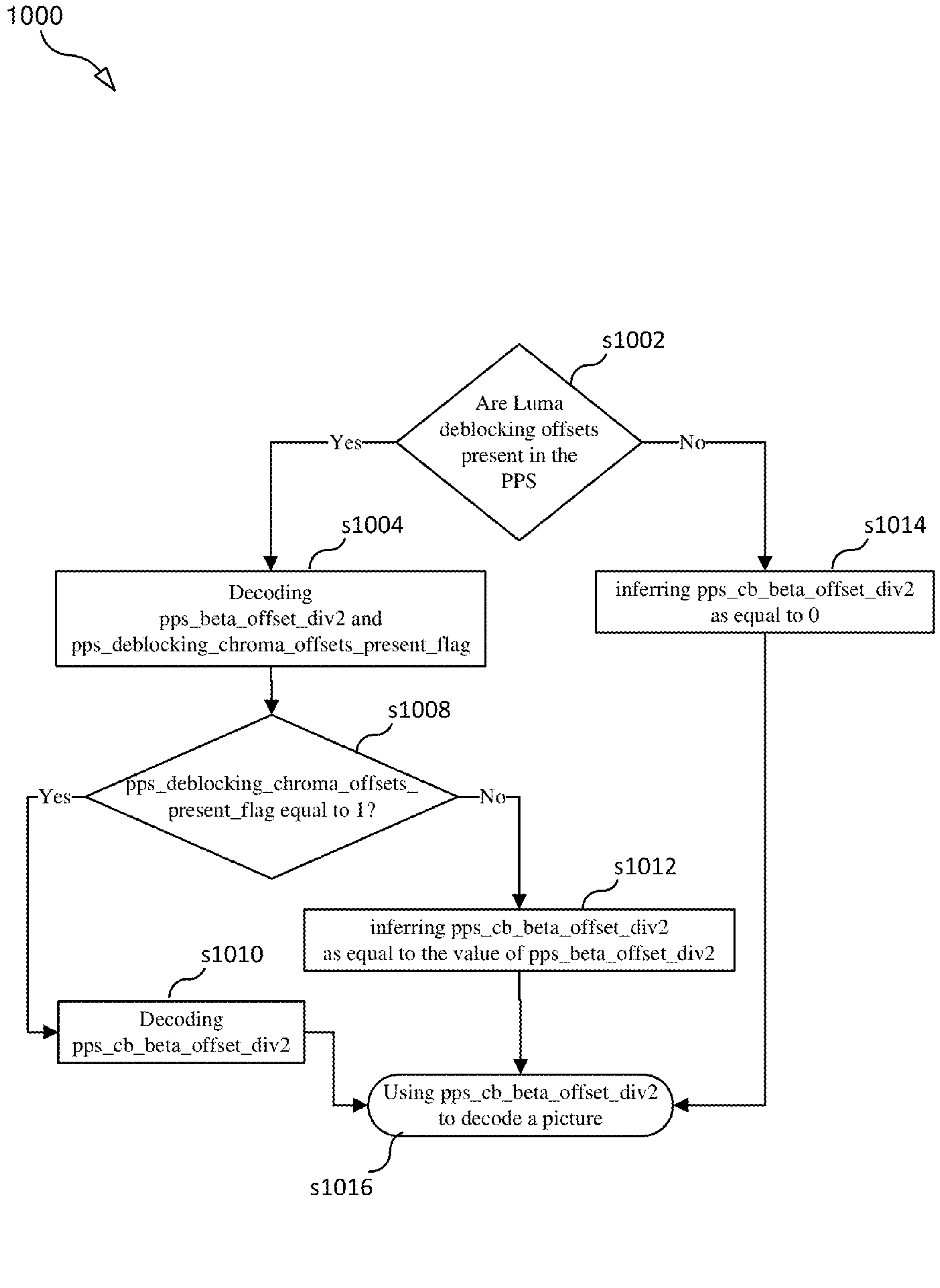
FIG. 10 is a flowchart illustrating a process according to an embodiment.

The construct can be explained by the following decoding method flowchart shown in FIG. 10 referring to the syntax table above. FIG. 10 illustrates a process 1000 according to an embodiment.

Step s1002 of process 1000 comprises determining whether luma deblocking offsets are present in the PPS or not. In one embodiment, determining whether luma deblocking offsets are present in the PPS or not comprises determining whether the value of pps_deblocking_filter_disabled_flag is equal to 0 or 1. Here 0 means that luma deblocking offsets are present, but the flag could alternatively be implemented in an opposite way where the value 1 means that they are present. If they are present, the process goes to step s1004, otherwise it goes to step s1014.

Step s1004 comprises decoding the luma deblocking offsets from the bitstream and a present flag is also decoded.

Step s1008 comprises determining whether the present flag specifies that chroma deblocking offsets are present. If the present flag specifies that chroma deblocking offsets are present, then the process goes to step s1010, otherwise it goes to step s1012.

Step s1010 (i.e., chroma deblocking offsets are present) comprises decoding the chroma deblocking offsets (e.g., decoding pps_cb_beta_offset_div2).

Step s1012 (i.e., chroma deblocking offsets not present) comprises inferring the values of the chroma deblocking offsets to be equal to the values of the luma deblocking offsets (e.g., inferring pps_cb_beta_offset_div2 as equal to the value of pps_beta_offset_div2).

Step s1014 (i.e., the luma deblocking offsets are not present) comprises inferring the chroma deblocking offsets to be equal to 0.

Step s1016 comprises using the chroma deblocking offsets in a process to decode the picture.

Figure 11:
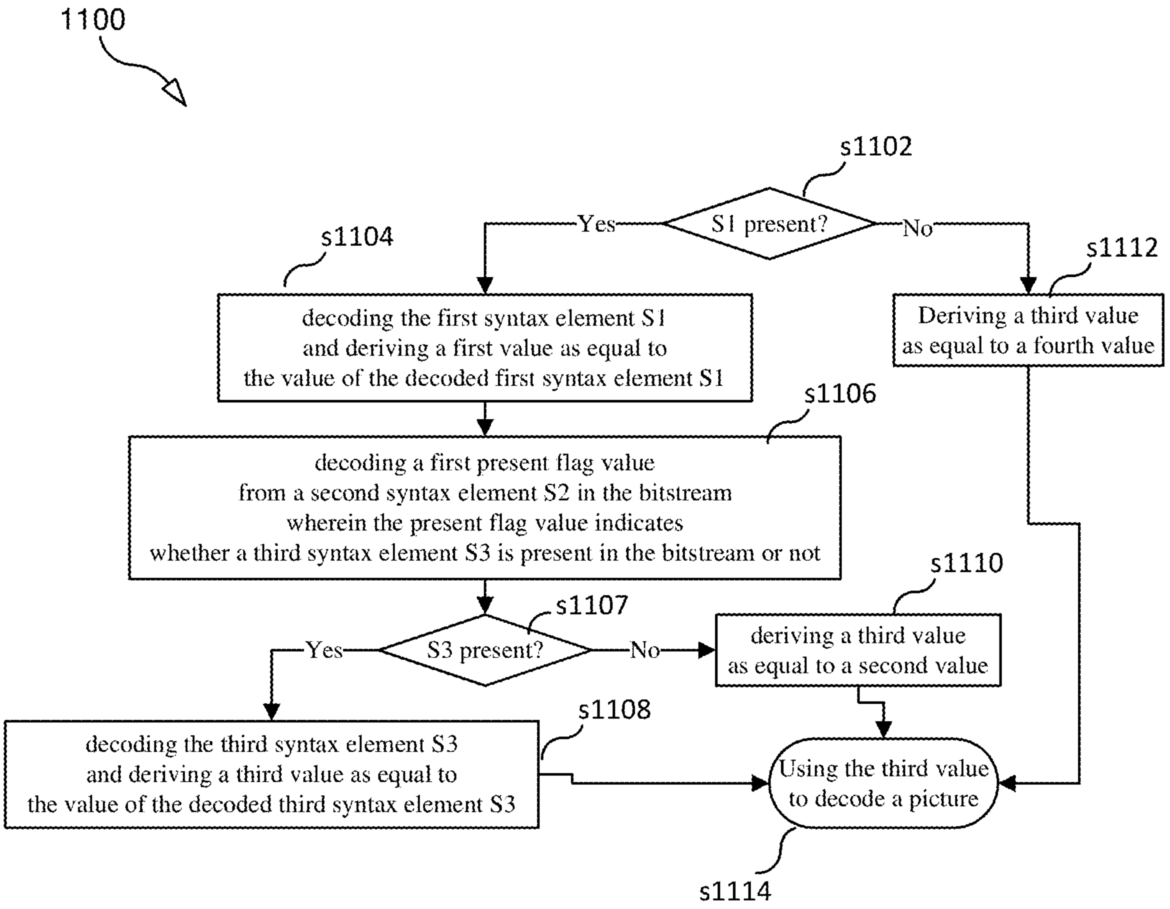
FIG. 11 is a flowchart illustrating a process according to an embodiment.

This novel construct can be used for signaling of other values than deblocking filter parameters. A flow chart of the generalized construct is shown in FIG. 11, which is a flowchart illustrating a process 1100 according to an embodiment. A decoder may perform all or a subset of the following steps in this generalized embodiment to decode a picture from a bitstream.

Step s1102 comprises determining whether a first syntax element S1 is present in the bitstream or not. If S1 is in the bitstream, the process goes to step s1104, otherwise it goes to step s1112.

Step s1104 (i.e., S1 is determined to be present in the bitstream) comprises decoding the first syntax element S1 and deriving a first value as equal to the value of the decoded first syntax element S1.

Step s1106 comprises decoding a first present flag value from a second syntax element S2 in the bitstream wherein the first present flag value indicates whether a third syntax element S3 is present in the bitstream or not.

Step s1107 comprises, using the first present flag to determine whether S3 is present in the bitstream. If S3 is present, the process goes to step s1108, otherwise it goes to step s1110.

Step s1108 (i.e., the first present flag value indicates that a third syntax element S3 is present in the bitstream) comprise decoding the third syntax element S3 and deriving a third value as equal to the value of the decoded third syntax element S3.

Step s1110 (i.e., the first present flag value indicates that a third syntax element S3 is present in the bitstream) comprises deriving the third value as equal to a second value.

Step s1112 (i.e., S1 is determined to not be present in the bitstream) comprises deriving a third value as equal to a fourth value Step s1114 comprises using the third value in a process to decode the picture wherein the first (S1), second (S2) and third (S3) syntax elements are three different syntax elements.

Use Case 2—an Alternative Way to Indicate the Presence and Inference of the Chroma Deblocking Offsets In other uses cases described herein, the presence of the chroma deblocking offsets is conditional based on the values of pps_deblocking_chroma_offsets_present_flag, ph_deblocking_chroma_offsets_present_flag and slice_deblocking_chroma_offsets_present_flag in the PPS, PH and SH, respectively.

In this use case, an alternative way to indicate the presence and inference of the chroma deblocking offsets is proposed. It is proposed to add a syntax element to each of the PPS, PH and SH indicating whether the chroma deblocking offsets are present in the PPS, PH, SH or not present at all.

The syntax elements may be called pps_deblocking_chroma_offsets_present_idc, ph_deblocking_chroma_offsets_present_idc and slice_deblocking_chroma_offsets_present_idc. When a proposed syntax element is equal to a first value (e.g. 1), it is determined that the chroma deblocking offsets are signaled in the corresponding syntax structure (PPS, PH or SH). When a proposed syntax element is equal to a second value (e.g. 0), it is determined the chroma deblocking offsets are not signaled but set equal to the values of the luma deblocking offsets of the corresponding syntax structure (PPS, PH or SH). When a proposed syntax element is equal to a third value (e.g. 2), it is determined that the chroma deblocking offsets are not signaled and the value of the chroma deblocking offsets are inferred as in the current VVC draft standard. This may mean that the value in the SH is inferred from the PH and that the value of the PH is inferred from the PPS. Alternatively, the value in the SH is inferred from the PPS. When the proposed syntax element is not present, we propose that the value is inferred to be equal to 2.

The proposed method is based on embodiment 1 in the way that when Syntax_A is not present, and the determined value of Syntax_D is equal to a first value (e.g. 0), the value of Syntax_A is inferred to be the value of Syntax_B, if the determined value of Syntax_D is equal to a second value (e.g. 2), the value of Syntax_A is inferred to be the value of Syntax_C, wherein the Syntax_A represents one of the chroma deblocking offsets. Here we use Syntax_A represents ph_cb_beta_offset_div2 as an example to show the syntax construct pseudo code:

TABLE 19

```
if ( Syntax_D == 1)
{
  // Syntax_A is present in the bitstream
  Syntax_A = decoded value of Syntax_A in the bitstream
}
else
```

TABLE 19-continued

```
{
  // Syntax_A is not present in the bitstream
  if (Syntax_D == 0)
  {
    Syntax_A = Syntax_B
  }
else // Syntax_D is equal to 2
{
  Syntax_A = Syntax_C
}
}
Where,
  Syntax_A = ph_cb_beta_offset_div2
  Syntax_B = ph_beta_offset_div2
  Syntax_C = pps_cb_beta_offset_div2
  Syntax_D = ph_deblocking_chroma_offsets_present_idc
```

In another version of this embodiment, at least one of Syntax_B, Syntax_C and Syntax_D is a constant value.

In another version of this embodiment, at least one of Syntax_B, Syntax_C and Syntax_D is a value derived from one or more syntax elements in the bitstream.

Below are example syntax and semantics. Here we use the PH as an example.

TABLE 20

| | Descriptor |
|---|---|
| pic_parameter_set_rbsp( ) { | |
| ... | ... |
| deblocking_filter_control_present_flag | u(1) |
| if( deblocking_filter_control_present_flag ) { | |
| deblocking_filter_override_enabled_flag | u(1) |
| pps_deblocking_filter_disabled_flag OR pps_deblocking_filter_enabled_flag | u(1) |
| if( !pps_deblocking_filter_disabled_flag OR pps_deblocking_filter_enabled_flag) { | |
| pps_beta_offset_div2 | se(v) |
| pps_tc_offset_div2 | se(v) |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |
| ... | ... |
| rbsp_trailing_bits( ) | |
| } | |

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.

pps_beta_offset_div2 and pps_tc_offset_div2 specify the default deblocking parameter offsets for β and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_beta_offset_div2 and pps_tc_offset_div2 shall both be in the range of −12 to 12, inclusive. When not present, the values of pps_beta_offset_div2 and pps_tc_offset_div2 are both inferred to be equal to 0.

pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are both inferred to be equal to 0.

pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are both inferred to be equal to 0.

TABLE 21

| | Descriptor |
|---|---|
| picture_header_structure( ) { | |
| ... | ... |
| if( deblocking_filter_override_enabled_flag && dbf_info_in_ph_flag ) { | |
| ph_deblocking_filter_override_flag | u(1) |
| if( ph_deblocking_filter_override_flag ) { | |
| ph_deblocking_filter_disabled_flag OR ph_deblocking_filter_enabled_flag | u(1) |
| if( !ph_deblocking_filter_disabled_flag OR ph_deblocking_filter_enabled_flag ) { | |
| ph_beta_offset_div2 | se(v) |
| ph_tc_offset_div2 | se(v) |
| if( ChromaArrayType != 0 ) { | |

TABLE 21-continued

| | Descriptor |
|---|---|
| ph_deblocking_chroma_offsets_present_idc | u(1) |
| if( ph_deblocking_chroma_offsets_present_idc == 1) { | |
| ph_cb_beta_offset_div2 | se(v) |
| ph_cb_tc_offset_div2 | se(v) |
| ph_cr_beta_offset_div2 | se(v) |
| ph_cr_to_offset_div2 | se(v) |
| } | |
| } | |
| } | |
| } | |
| } | |
| } | |

ph_deblocking_filter_override_flag equal to 1 specifies that deblocking parameters are present in the PH. ph_deblocking_filter_override_flag equal to 0 specifies that deblocking parameters are not present in the PH. When not present, the value of ph_deblocking_filter_override_flag is inferred to be equal to 0.

ph_deblocking_filter_disabled_flag equal to 1 specifies that the operation of the deblocking filter is not applied for the slices associated with the PH. ph_deblocking_filter_disabled_flag equal to 0 specifies that the operation of the deblocking filter is applied for the slices associated with the PH. When ph_deblocking_filter_disabled_flag is not present, it is inferred to be equal to pps_deblocking_filter_disabled_flag. As noted above, in some embodiments, the ph_deblocking_filter_disabled_flag is replaced with the ph_deblocking_filter_enabled_flag.

ph_beta_offset_div2 and ph_tc_offset_div2 specify the deblocking parameter offsets for β and tC (divided by 2) that are applied to the luma component for the slices associated with the PH. The values of ph_beta_offset_div2 and ph_tc_offset_div2 shall both be in the range of −12 to 12, inclusive. When not present, the values of ph_beta_offset_div2 and ph_tc_offset_div2 are inferred to be equal to pps_beta_offset_div2 and pps_tc_offset_div2, respectively.

ph_deblocking_chroma_offsets_present_idc equal to 1 specifies the presence of deblocking parameter offsets for β and tC (divided by 2) that are applied to the Cb and Cr components in the PH. ph_deblocking_chroma_offsets_present_idc equal to 0 or 2 specifies the absence of deblocking parameter offsets for β and tC (divided by 2) that are applied to the Cb and Cr components in the PH. When not present, the value of ph_deblocking_chroma_offsets_present_idc is inferred to be equal to 2.

ph_cb_beta_offset_div2 and ph_cb_tc_offset_div2 specify the deblocking parameter offsets for β and tC (divided by 2) that are applied to the Cb component for the slices associated with the PH. The values of ph_cb_beta_offset_div2 and ph_cb_tc_offset_div2 shall both be in the range of −12 to 12, inclusive. When not present, the values of ph_cb_beta_offset_div2 and ph_cb_tc_offset_div2 are inferred as follows: i) When ph_deblocking_chroma_offsets_present_idc is equal to 0, the values of ph_cb_beta_offset_div2 and ph_cb_tc_offset_div2 are inferred to be equal to ph_beta_offset_div2 and ph_tc_offset_div2, respectively; and 2) When ph_deblocking_chroma_offsets_present_idc is equal to 2, the values of ph_cb_beta_offset_div2 and ph_cb_tc_offset_div2 are inferred to be equal to pps_cb_beta_offset_div2 and pps_cb_tc_offset_div2, respectively.

ph_cr_beta_offset_div2 and ph_cr_tc_offset_div2 specify the deblocking parameter offsets for β and tC (divided by 2) that are applied to the Cr component for the slices associated with the PH. The values of ph_cr_beta_offset_div2 and ph_cr_tc_offset_div2 shall both be in the range of −12 to 12, inclusive. When not present, the values of ph_cr_beta_offset_div2 and ph_cr_tc_offset_div2 are inferred as follows: 1) When ph_deblocking_chroma_offsets_present_idc is equal to 0, the values of ph_cr_beta_offset_div2 and ph_cr_tc_offset_div2 are inferred to be equal to ph_beta_offset_div2 and ph_tc_offset_div2, respectively; and 2) When ph_deblocking_chroma_offsets_present_idc is equal to 2, the values of ph_cr_beta_offset_div2 and ph_cr_tc_offset_div2 are inferred to be equal to pps_cr_beta_offset_div2 and pps_cr_tc_offset_div2, respectively.

Embodiment 2—an Example of Disable the Operation of the Deblocking Filter to the Chroma Components while the Operation of the Deblocking Filter to the Luma Component is Enabled It is proposed to add syntax element in the PPS, PH and SH to disable the operation of the deblocking filter to the chroma components while the operation of the deblocking filter to the luma component is enabled. Embodiment 2 may be combined with Embodiment 1.

Below are example syntax and semantics in embodiment 2.

TABLE 22

| | Descriptor |
|---|---|
| pic_parameter_set_rbsp( ) { | |
| ... | ... |
| deblocking_filter_control_present_flag | u(1) |
| if( deblocking_filter_control_present_flag ) { | |
| deblocking_filter_override_enabled_flag | u(1) |
| pps_deblocking_filter_disabled_flag OR pps_deblocking_filter_enabled_flag | u(1) |
| if( !pps_deblocking_filter_disabled_flag OR pps_deblocking_filter_enabled_flag) { | |
| pps_chroma_deblocking_filter_disabled_flag OR OR pps_chroma_deblocking_filter_enabled_flag | u(1) |
| pps_beta_offset_div2 | se(v) |
| pps_tc_offset_div2 | se(v) |
| if( !pps_chroma_deblocking_filter_disabled_flag OR pps_chroma_deblocking_filter_enabled_flag) { | |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |
| } | |
| rbsp_trailing_bits( ) | |
| } | |

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0. As noted above, the pps_deblocking_filter_diabled_flag may be replaced with the pps_deblocking_filter_enbabled_flag.

pps_chroma_deblocking_filter_disabled_flag equal to 1 specifies that the operation of deblocking filter to the chroma components is not applied for slices referring to the PPS in which slice_chroma_deblocking_filter_disabled_flag is not present. pps_chroma_deblocking_filter_disabled_flag equal to 0 specifies that the operation of the deblocking filter to the chroma components is applied for slices referring to the PPS in which slice_chroma_deblocking_filter_disabled_flag is not present. When not present, the value of pps_chroma_deblocking_filter_disabled_flag is inferred to be equal to 0. The pps_chroma_deblocking_filter_disabled_flag may be replaced with the pps_chroma_deblocking_filter_enbabled_flag.

pps_beta_offset_div2 and pps_tc_offset_div2 specify the default deblocking parameter offsets for β and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_beta_offset_div2 and pps_tc_offset_div2 shall both be in the range of −12 to 12, inclusive. When not present, the values of pps_beta_offset_div2 and pps_tc_offset_div2 are both inferred to be equal to 0.

pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are both inferred to be equal to pps_beta_offset_div2 and pps_tc_offset_div2, respectively.

pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are both inferred to be equal to pps_beta_offset_div2 and pps_tc_offset_div2, respectively.

TABLE 23

| | Descriptor |
|---|---|
| picture_header_structure( ) { | |
| ... | ... |
| if( deblocking_filter_override_enabled_flag && dbf_info_in_ph_flag ) { | |
| ph_deblocking_filter_override_flag | u(1) |
| if( ph_deblocking_filter_override_flag ) { | |
| ph_deblocking_filter_disabled_flag OR ph_deblocking_filter_enabled_flag | u(1) |
| if( !ph_deblocking_filter_disabled_flag OR ph_deblocking_filter_enabled_flag ) { | |
| ph_chroma_deblocking_filter_disabled_flag OR ph_chroma_deblocking_filter_enabled_flag | u(1) |
| ph_beta_offset_div2 | se(v) |
| ph_tc_offset_div2 | se(v) |
| if( !ph_chroma_deblocking_filter_disabled_flag OR ph_chroma_deblocking_filter_enabled_flag) { | |
| ph_cb_beta_offset_div2 | se(v) |
| ph_cb_tc_offset_div2 | se(v) |
| ph_cr_beta_offset_div2 | se(v) |
| ph_cr_tc_offset_div2 | se(v) |
| } | |
| } | |
| } | |
| } | |
| ... | ... |

ph_deblocking_filter_override_flag equal to 1 specifies that deblocking parameters are present in the PH. ph_deblocking_filter_override_flag equal to 0 specifies that deblocking parameters are not present in the PH. When not present, the value of ph_deblocking_filter_override_flag is inferred to be equal to 0.

ph_deblocking_filter_disabled_flag equal to 1 specifies that the operation of the deblocking filter is not applied for the slices associated with the PH. ph_deblocking_filter_disabled_flag equal to 0 specifies that the operation of the deblocking filter is applied for the slices associated with the PH. When ph_deblocking_filter_disabled_flag is not present, it is inferred to be equal to pps_deblocking_filter_disabled_flag. As noted above, in some embodiments, the ph_deblocking_filter_disabled_flag is replaced with the ph_deblocking_filter_enabled_flag.

ph_chroma_deblocking_filter_disabled_flag equal to 1 specifies that the operation of the deblocking filter to the chroma components is not applied for the slices associated with the PH. ph_chroma_deblocking_filter_disabled_flag equal to 0 specifies that the operation of the deblocking filter to the chroma components is applied for the slices associated with the PH. When ph_chroma_deblocking_filter_disabled_flag is not present, it is inferred to be equal to pps_chroma_deblocking_filter_disabled_flag. In some embodiments, the ph_chroma_deblocking_filter_disabled_flag is replaced with the ph_chroma_deblocking_filter_enabled_flag.

ph_beta_offset_div2 and ph_tc_offset_div2 specify the deblocking parameter offsets for β and tC (divided by 2) that are applied to the luma component for the slices associated with the PH. The values of ph_beta_offset_div2 and ph_tc_offset_div2 shall both be in the range of −12 to 12, inclusive. When not present, the values of ph_beta_offset_div2 and ph_tc_offset_div2 are inferred to be equal to pps_beta_offset_div2 and pps_tc_offset_div2, respectively.

ph_cb_beta_offset_div2 and ph_cb_tc_offset_div2 specify the deblocking parameter offsets for β and tC (divided by 2) that are applied to the Cb component for the slices associated with the PH. The values of ph_cb_beta_offset_div2 and ph_cb_tc_offset_div2 shall both be in the range of −12 to 12, inclusive. When not present, the values of ph_cb_beta_offset_div2 and ph_cb_tc_offset_div2 are inferred to be equal to pps_cb_beta_offset_div2 and pps_cb_tc_offset_div2, respectively.

ph_cr_beta_offset_div2 and ph_cr_tc_offset_div2 specify the deblocking parameter offsets for β and tC (divided by 2) that are applied to the Cr component for the slices associated with the PH. The values of ph_cr_beta_offset_div2 and ph_cr_tc_offset_div2 shall both be in the range of −12 to 12, inclusive. When not present, the values of ph_cr_beta_offset_div2 and ph_cr_tc_offset_div2 are inferred to be equal to pps_cr_beta_offset_div2 and pps_cr_tc_offset_div2, respectively.

slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to ph_deblocking_filter_override_flag.

slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When slice_deblocking_filter_disabled_flag is not present, it is inferred to be equal to ph_deblocking_filter_disabled_flag or !ph_deblocking_filter_enabled_flag. In some embodiments, the slice_deblocking_filter_disabled_flag is replaced with the slice_deblocking_filter_enabled_flag.

slice_chroma_deblocking_filter_disabled_flag equal to 1 specifies that the operation of the deblocking filter to the chroma components is not applied for the current slice. slice_chroma_deblocking_filter_disabled_flag equal to 0 specifies that the operation of the deblocking filter to the chroma components is applied for the current slice. When slice_chroma_deblocking_filter_disabled_flag is not present, it is inferred to be equal to ph_chroma_deblocking_filter_disabled_flag. In some embodiments, the slice_chroma_deblocking_filter_disabled_flag is replaced with the slice_chroma_deblocking_filter_enabled_flag.

slice_beta_offset_div2 and slice_tc_offset_div2 specify the deblocking parameter offsets for β and tC (divided by 2) that are applied to the luma component for the current slice. The values of slice_beta_offset_div2 and slice_to_offset_div2 shall both be in the range of −12 to 12, inclusive. When not present, the values of slice_beta_offset_div2 and slice_tc_offset_div2 are inferred to be equal to ph_beta_offset_div2 and ph_tc_offset_div2, respectively.

slice_cb_beta_offset_div2 and slice_cb_tc_offset_div2 specify the deblocking parameter offsets for β and tC (divided by 2) that are applied to the Cb component for the current slice. The values of slice_cb_beta_offset_div2 and slice_cb_tc_offset_div2 shall both be in the range of −12 to

TABLE 24

| | Descriptor |
|---|---|
| slice_header( ) { | |
| ... | ... |
| if( deblocking_filter_override_enabled_flag && !dbf_info_in_ph_flag ) | |
| slice_deblocking_filter_override_flag | u(1) |
| if( slice_deblocking_filter_override_flag ) { | |
| slice_deblocking_filter_disabled_flag OR slice_deblocking_filter_enabled_flag | u(1) |
| if( !slice_deblocking_filter_disabled_flag OR slice_deblocking_filter_enabled_flag) { | |
| slice_chroma_deblocking_filter_disabled_flag OR slice_chroma_deblocking_filter_enabled_flag | u(1) |
| slice_beta_offset_div2 | se(v) |
| slice_tc_offset_div2 | se(v) |
| if( !slice_chroma_deblocking_filter_disabled_flag OR slice_chroma_deblocking_filter_enabled_flag) { | |
| slice_cb_beta_offset_div2 | se(v) |
| slice_cb_tc_offset_div2 | se(v) |
| slice_cr_beta_offset_div2 | se(v) |
| slice_cr_tc_offset_div2 | se(v) |
| } | |
| } | |
| } | |
| ... | ... |
| byte_alignment( ) | |
| } | |

12, inclusive. When not present, the values of slice_cb_beta_offset_div2 and slice_cb_tc_offset_div2 are inferred to be equal to ph_cb_beta_offset_div2 and ph_cb_tc_offset_div2, respectively.

slice_cb_beta_offset_div2 and slice_cb_tc_offset_div2 specify the deblocking parameter offsets for β and tC (divided by 2) that are applied to the Cr component for the current slice. The values of slice_cr_beta_offset_div2 and slice_cr_tc_offset_div2 shall both be in the range of −12 to 12, inclusive. When not present, the values of slice_cr_beta_offset_div2 and slice_cr_tc_offset_div2 are inferred to be equal to ph_cr_beta_offset_div2 and ph_cr_tc_offset_div2, respectively.

Embodiment 3

As illustrated above, the presence of syntax elements that are applied to two chroma components may be controlled by a one-bit syntax element. In another words, in some embodiments, the presence of Cr follows the presence of Cb.

In this embodiment a first one-bit syntax element is used for the Cb component and a second one-bit syntax element is used for the Cr component separately to control the present of the syntax elements that are applied to the Cb component and to the Cr component.

In a variant of this embodiment a two-bits syntax element is used to jointly control the present of the syntax element that are applied to the Cb component and to the Cr component, as described below.

If the value of two-bit syntax element is equal to 0 it specifies the absence of the syntax elements that are applied to the Cb and Cr components.

If the value of two-bit syntax element is equal to 1 it specifies the presence of the syntax elements that are applied to the Cb and the absence of the syntax elements that are applied to the Cr components.

If the value of two-bit syntax element is equal to 2 it specifies the absence of the syntax elements that are applied to the Cb and the presence of the syntax elements that are applied to the Cr components.

If the value of two-bit syntax element is equal to 3 it specifies the presence of the syntax elements that are applied to the Cb and Cr components.

Embodiment 4—Differentiating Based on Inference to X and Signaling as X

In this embodiment a condition method is proposed that differentiates between the inference of the value of the syntax element A to the value X and explicit signaling of syntax element A equal to the value X. In one example of the current embodiment, the control of the Cb component and Cr component may be defined as follows.

If the value of syntax element A is signaled as a first value, it specifies the absence of the syntax elements that are applied to the Cb and Cr components.

If the value of syntax element A is inferred as a first value, it specifies the presence of the syntax elements that are applied to the Cb and the absence of the syntax elements that are applied to the Cr components.

If the value of syntax element A is signaled as a second value, it specifies the absence of the syntax elements that are applied to the Cb and the presence of the syntax elements that are applied to the Cr components.

If the value of syntax element A is inferred as a second value, it specifies the presence of the syntax elements that are applied to the Cb and Cr components.

Figure 12:
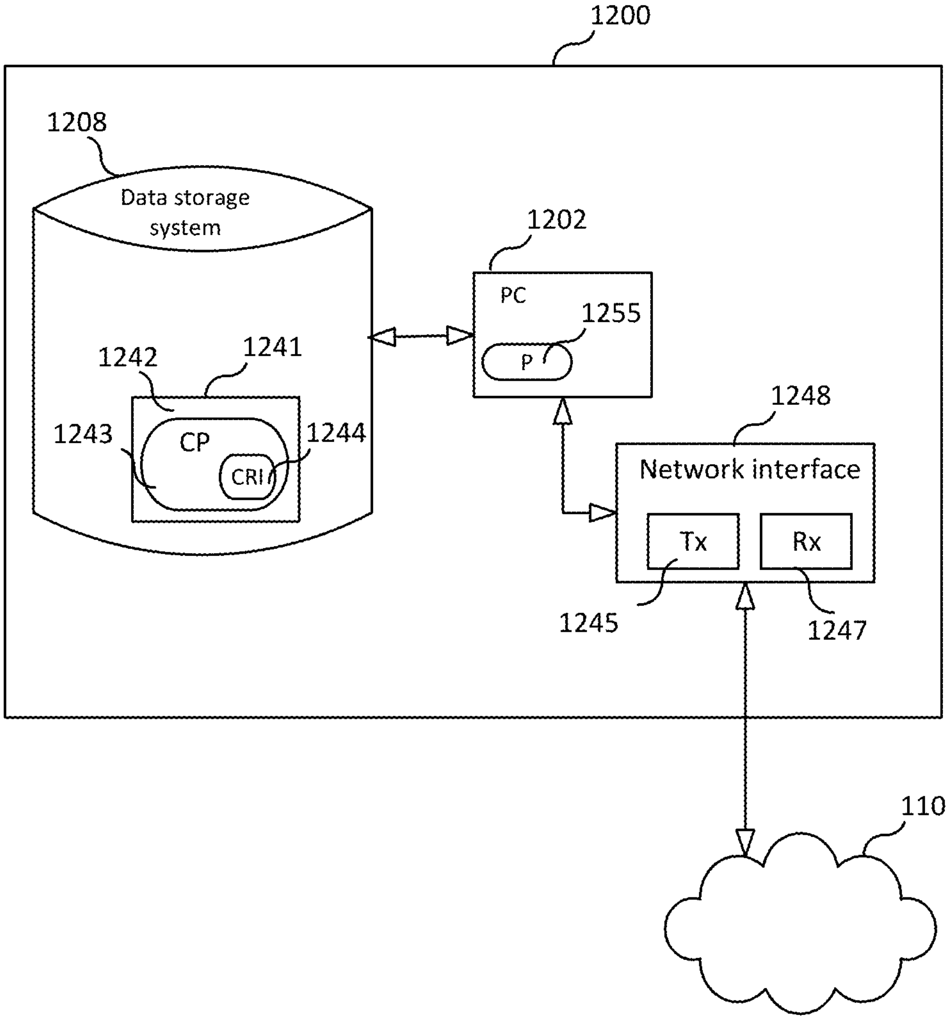
FIG. 12 is a block diagram of an apparatus according to an embodiment.

FIG. 12 is a block diagram of an apparatus 1200 for implementing decoder 204 and/or encoder 202, according to some embodiments. When apparatus 1200 implements a decoder, apparatus 1200 may be referred to as a "decoding apparatus 1200," and when apparatus 1200 implements an encoder, apparatus 1200 may be referred to as an "encoding apparatus 1200." As shown in FIG. 12, apparatus 1200 may comprise: processing circuitry (PC) 1202, which may include one or more processors (P) 1255 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1200 may be a distributed computing apparatus); at least one network interface 1248 comprising a transmitter (Tx) 1245 and a receiver (Rx) 1247 for enabling apparatus 1200 to transmit data to and receive data from other nodes connected to a network 110 (e.g., an Internet Protocol (IP) network) to which network interface 1248 is connected (directly or indirectly) (e.g., network interface 1248 may be wirelessly connected to the network 110, in which case network interface 1248 is connected to an antenna arrangement); and a storage unit (a.k.a., "data storage system") 1208, which may include one or more non-volatile storage devices and/or one or more volatile storage devices. In embodiments where PC 1202 includes a programmable processor, a computer program product (CPP) 1241 may be provided. CPP 1241 includes a computer readable medium (CRM) 1242 storing a computer program (CP) 1243 comprising computer readable instructions (CRI) 1244. CRM 1242 may be a non-transitory computer readable medium, such as, magnetic media (e.g., a hard disk), optical media, memory devices (e.g., random access memory, flash memory), and the like. In some embodiments, the CRI 1244 of computer program 1243 is configured such that when executed by PC 1202, the CRI causes apparatus 1200 to perform steps described herein (e.g., steps described herein with reference to the flow charts). In other embodiments, apparatus 1200 may be configured to perform steps described herein without the need for code. That is, for example, PC 1202 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method, performed by a video decoder, for obtaining chroma deblocking offsets to be used for decoding a picture received with a bitstream, the method comprising:

determining whether syntax elements for the chroma deblocking offsets are present in a picture header for the picture received with the bitstream;

as a result of determining that the syntax elements for the chroma deblocking offsets are not present in the picture header, then, depending on a chroma tool offsets present flag that indicates whether or not chroma tool offset related syntax elements are present in a picture parameter set (PPS), deriving the chroma deblocking offsets to be equal to one of the following:

i) corresponding chroma deblocking offsets decoded from syntax elements for the chroma deblocking offsets present in the picture parameter set, or ii) corresponding luma deblocking offsets to be used for decoding the picture; and decoding the picture using the derived chroma deblocking offsets.

2. The method of claim 1, wherein the method further comprises decoding from the bitstream a syntax element for the chroma tool offsets present flag.

3. The method of claim 2, wherein the syntax element for the chroma tool offsets present flag is decoded from the picture parameter set.

4. The method of claim 1, wherein the method further comprises decoding a syntax element for the chroma tool offsets present flag from the bitstream, and the chroma deblocking offsets are derived to be equal to:

i) the corresponding chroma deblocking offsets decoded from syntax elements for the chroma deblocking offsets present in the picture parameter set as a result of determining that: a) the chroma tool offsets present flag is equal to a first value or b) the chroma tool offsets present flag is not equal to a second value, or ii) the corresponding luma deblocking offsets as a result of determining that:

a) the chroma tool offsets present flag is equal to the second value or b) the chroma tool offsets present flag is not equal to the first value.

5. The method of claim 4, wherein the syntax element for the chroma tool offsets present flag is decoded from the picture parameter set.

6. The method of claim 1, wherein the method further comprises:

determining whether syntax elements for the luma deblocking offsets are present in the picture header; and as a result of determining that syntax elements for the luma deblocking offsets are present in the picture header, decoding the syntax elements for the luma deblocking offsets present in the picture header, otherwise deriving the luma deblocking offsets to be equal to corresponding luma deblocking offsets decoded from syntax elements for the luma deblocking offsets present in the picture parameter set.

7. The method of claim 1, wherein the chroma deblocking offsets are offsets for beta and tC applied to chroma components, and the luma deblocking offsets are offsets for beta and tC applied to luma components.

8. A non-transitory computer readable storage medium storing a computer program comprising instructions which when executed by processing circuitry causes the processing circuitry to perform the method of claim 1.

9. A video decoder, the video decoder comprising:

memory; and processing circuitry, wherein the video decoder is configured to perform a method for obtaining chroma deblocking offsets to be used for decoding a picture received with a bitstream, the method comprising:

determining whether syntax elements for the chroma deblocking offsets are present in a picture header for the picture received with the bitstream;

as a result of determining that the syntax elements for the chroma deblocking offsets are not present in the picture header, then, depending on a chroma tool offsets present flag that indicates whether or not chroma tool offset related syntax elements are present in a picture parameter set (PPS), deriving the chroma deblocking offsets to be equal to one of the following:

i) corresponding chroma deblocking offsets decoded from syntax elements for the chroma deblocking offsets present in the PPS, or ii) corresponding luma deblocking offsets to be used for decoding the picture; and decoding the picture using the derived chroma deblocking offsets.

10. The video decoder of claim 9, wherein the method further comprises decoding from the bitstream a syntax element for the chroma tool offsets present flag.

11. The video decoder of claim 10, wherein the syntax element for the chroma tool offsets present flag is decoded from the picture parameter set.

12. The video decoder of claim 9, wherein the method further comprises decoding a syntax element for the chroma tool offsets present flag from the bitstream, and the chroma deblocking offsets are derived to be equal to:

i) the corresponding chroma deblocking offsets decoded from syntax elements for the chroma deblocking offsets present in the picture parameter set as a result of determining that: a) the chroma tool offsets present flag is equal to a first value or b) the chroma tool offsets present flag is not equal to a second value, or ii) the corresponding luma deblocking offsets as a result of determining that: a) the chroma tool offsets present flag is equal to the second value or b) the chroma tool offsets present flag is not equal to the first value.

13. The video decoder of claim 12, wherein the syntax element for the chroma tool offsets present flag is decoded from the picture parameter set.

14. The video decoder of claim 9, wherein the method further comprises:

determining whether syntax elements for the luma deblocking offsets are present in the picture header; and as a result of determining that syntax elements for the luma deblocking offsets are present in the picture header, decoding the syntax elements for the luma deblocking offsets present in the picture header, otherwise deriving the luma deblocking offsets to be equal to corresponding luma deblocking offsets decoded from syntax elements for the luma deblocking offsets present in the picture parameter set.

15. The video decoder of claim 9, wherein the chroma deblocking offsets are offsets for beta and tC applied to chroma components, and the luma deblocking offsets are offsets for beta and tC applied to luma components.

* * * * *